US012696029B2

(12) United States Patent
Bean et al.

(10) Patent No.: US 12,696,029 B2
(45) **Date of Patent: *Jul. 28, 2026**

(54) SYSTEMS, APPARATUS, AND METHODS FOR ACOUSTIC TRANSPARENCY

(71) Applicant: QUALCOMM Incorporated, San Diego, CA (US)

(72) Inventors: Jacob Jon Bean, Vista, CA (US); Rogerio Guedes Alves, Macomb Township, MI (US); Kamlesh Lakshminarayanan, San Diego, CA (US); Walter Andres Zuluaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 18/506,477

(22) Filed: Nov. 10, 2023

(65) Prior Publication Data

US 2024/0080609 A1 Mar. 7, 2024

Related U.S. Application Data

(63) Continuation of application No. 17/357,019, filed on Jun. 24, 2021, now Pat. No. 11,849,274.

(Continued)

(51) Int. Cl.
*H04R 1/10* (2026.01)
*G10K 11/16* (2006.01)

(52) U.S. Cl.
CPC ........... *H04R 1/1083* (2013.01); *G10K 11/16* (2013.01); *H04R 1/1016* (2013.01);
(Continued)

(58) Field of Classification Search
CPC ....... G10K 11/17827; G10K 11/17885; G10K 11/16; G10K 2210/1081; H04R 1/1083;
(Continued)

(56) References Cited

U.S. PATENT DOCUMENTS

2008/0137873 A1 6/2008 Goldstein
2010/0027804 A1 2/2010 Kano
(Continued)

FOREIGN PATENT DOCUMENTS

CN 105794228 A 7/2016
CN 107211205 A 9/2017
WO 2016115622 A1 7/2016

OTHER PUBLICATIONS

Gupta R., et al., "On the Use of Closed-back Headphones for Active Hear-through Equalization in Augmented Reality Applications", AES International Conference on Audio for Virtual and Augmented Reality, Aug. 20, 2018-Aug. 22, 2018, XP093179604, Aug. 20, 2018, 13 Pages.

(Continued)

*Primary Examiner* — Jason R Kurr
(74) *Attorney, Agent, or Firm* — QUALCOMM Incorporated; Espartaco Diaz Hidalgo

(57) ABSTRACT

Methods, systems, computer-readable media, and apparatuses for audio signal processing are presented. A device for audio signal processing includes a memory configured to store audio data and a processor coupled to the memory. The processor is configured to use an adaptation filter to adapt update filter coefficients of an update filter. The update filter coefficients are adapted based on a difference between an internal microphone signal and an output of the adaptation filter. An input of the adaptation filter is based on an external microphone signal. The processor is also configured to output an output signal from a hear-through filter. The hear-through filter includes the update filter and the adap-
(Continued)

tation filter. The processor is further configured to cause a loudspeaker to produce an audio output signal based on the output signal of the hear-through filter.

30 Claims, 22 Drawing Sheets

Related U.S. Application Data

(60) Provisional application No. 63/044,201, filed on Jun. 25, 2020.

(52) U.S. Cl.
CPC .. *G10K 2210/1081* (2013.01); *H04R 2420/07* (2013.01); *H04R 2460/01* (2013.01)

(58) Field of Classification Search
CPC .............. H04R 1/1016; H04R 2420/07; H04R 2460/01
See application file for complete search history.

(56) References Cited

U.S. PATENT DOCUMENTS

| | | | | |
|---|---|---|---|---|
| 2013/0243227 | A1 | 9/2013 | Kinsbergen et al. | |
| 2014/0044275 | A1 | 2/2014 | Goldstein et al. | |
| 2015/0010158 | A1* | 1/2015 | Broadley | A61F 11/14 381/58 |
| 2015/0195641 | A1 | 7/2015 | Di et al. | |
| 2015/0243271 | A1* | 8/2015 | Goldstein | G10K 11/17854 381/71.6 |
| 2016/0210958 | A1 | 7/2016 | Gauger, Jr. et al. | |
| 2016/0300562 | A1 | 10/2016 | Goldstein | |
| 2017/0148428 | A1 | 5/2017 | Thuy et al. | |
| 2017/0318400 | A1 | 11/2017 | Westermann et al. | |
| 2018/0113673 | A1 | 4/2018 | Sheynblat | |
| 2019/0320268 | A1 | 10/2019 | Blau et al. | |
| 2019/0349665 | A1 | 11/2019 | Grinker | |
| 2020/0020313 | A1 | 1/2020 | Hua et al. | |
| 2020/0204936 | A1 | 6/2020 | Mathurine et al. | |
| 2020/0380945 | A1 | 12/2020 | Woodruff et al. | |
| 2020/0387341 | A1 | 12/2020 | Robinson et al. | |
| 2021/0304725 | A1* | 9/2021 | Kannan | G10K 11/17813 |
| 2021/0409860 | A1 | 12/2021 | Bean | |
| 2022/0157291 | A1* | 5/2022 | McCutcheon | G10K 11/17854 |

OTHER PUBLICATIONS

International Preliminary Report on Patentability—PCT/US2021/039141—The International Bureau of WIPO—Geneva, Switzerland—Jan. 5, 2023.

International Search Report and Written Opinion—PCT/US2021/039141—ISA/EPO—Jan. 20, 2022.

Partial International Search Report—PCT/US2021/039141—ISA/EPO—Oct. 15, 2021.

Stefan L., et al., "Active Occlusion Cancellation with Hear-Through Equalization for Headphones", 2018 IEEE International Conference on Acoustics, Speech and Signal Processing (ICASSP), IEEE, Apr. 15, 2018 (Apr. 15, 2018), pp. 241-245, XP033401158, DOI: 10.1109/ICASSP.2018.8461834 [retrieved on Sep. 10, 2018] section III.C, figure 3.

Taiwan Search Report—TW110123357—TIPO—Aug. 19, 2025.

* cited by examiner

Key:
Broken line with “>” represents bone-conducted sounds
Broken line with “X” represents bone-conducted and air-conducted sounds

SYSTEMS, APPARATUS, AND METHODS FOR ACOUSTIC TRANSPARENCY

CROSS-REFERENCE TO RELATED APPLICATIONS

The present application claims priority from and is a continuation of pending U.S. patent application Ser. No. 17/357,019, filed Jun. 24, 2021, and entitled "SYSTEMS, APPARATUS, AND METHODS FOR ACOUSTIC TRANSPARENCY," which claims priority from U.S. Provisional Patent Application No. 63/044,201, filed Jun. 25, 2020, entitled "SYSTEMS, APPARATUS, AND METHODS FOR ACOUSTIC TRANSPARENCY," the content of each of which is incorporated herein by reference in its entirety.

FIELD OF THE DISCLOSURE

Aspects of the disclosure relate to audio signal processing.

BACKGROUND

Hearable devices or "hearables" (such as "smart headphones," "smart earphones," or "smart earpieces") are becoming increasingly popular. Such devices, which are designed to be worn over the ear or in the ear, have been used for multiple purposes, including wireless transmission and fitness tracking. As shown in FIG. 1A, the hardware architecture of a hearable typically includes a loudspeaker to reproduce sound to a user's ear; a microphone to sense the user's voice and/or ambient sound; and signal processing circuitry to communicate with another device (e.g., a smartphone). A hearable may also include one or more sensors: for example, to track heart rate, to track physical activity (e.g., body motion), or to detect proximity. In some examples, hearables may be worn in pairs, such as hearable D10R and hearable D10L of FIG. 1B, which may communicate using wired signals or wireless signals WS10, WS20 of FIG. 1B.

FIG. 2 shows a diagram of an implementation of hearable D10R, which is configured to be worn at a right ear of a user. The hearable D10R may include, for example, a hook 214 or wing to secure the hearable D10R in the cymba and/or pinna of the ear; an ear tip 212 surrounding a loudspeaker 210 to provide passive acoustic isolation; one or more inputs 204 such as switches and/or touch sensors for user control; one or more additional microphones 202; and one or more proximity sensors 208 (e.g., to detect that the device is being worn).

BRIEF DESCRIPTION OF THE DRAWINGS

Aspects of the disclosure are illustrated by way of example. In the accompanying figures, like reference numbers indicate similar elements.

DETAILED DESCRIPTION

Figure 1B:
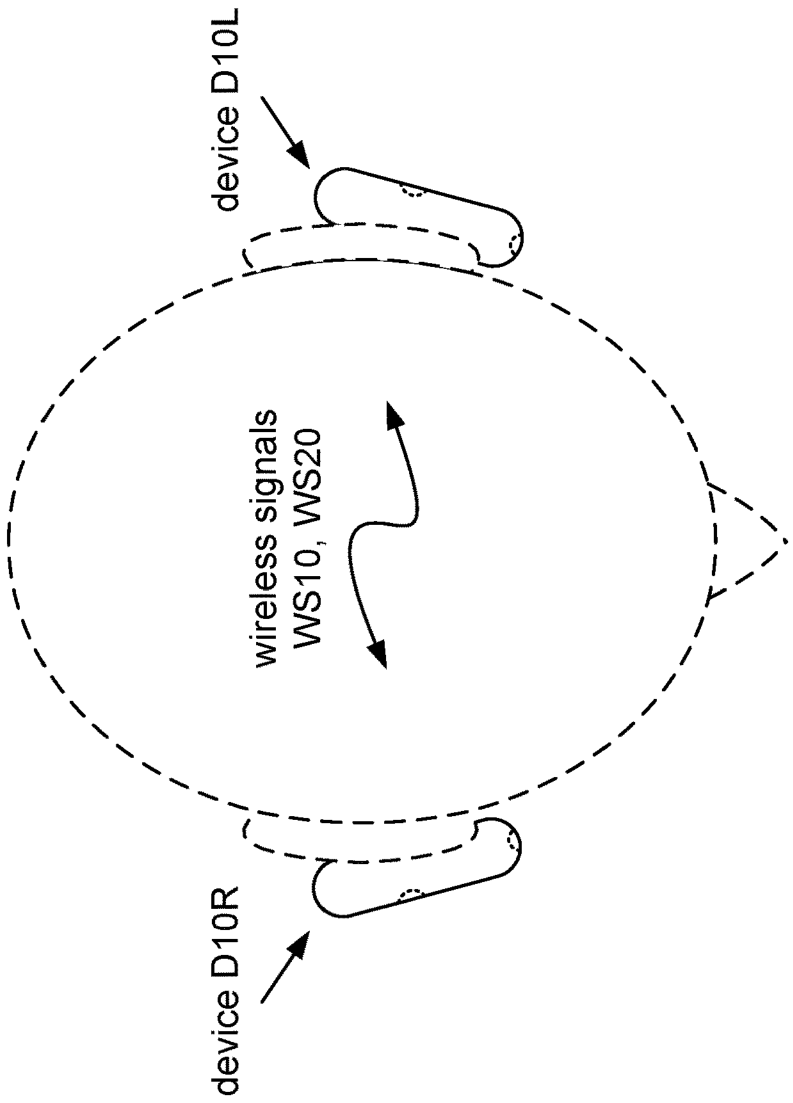
FIG. 1B shows communications among hearables worn at each ear of a user.
Figure 1A:
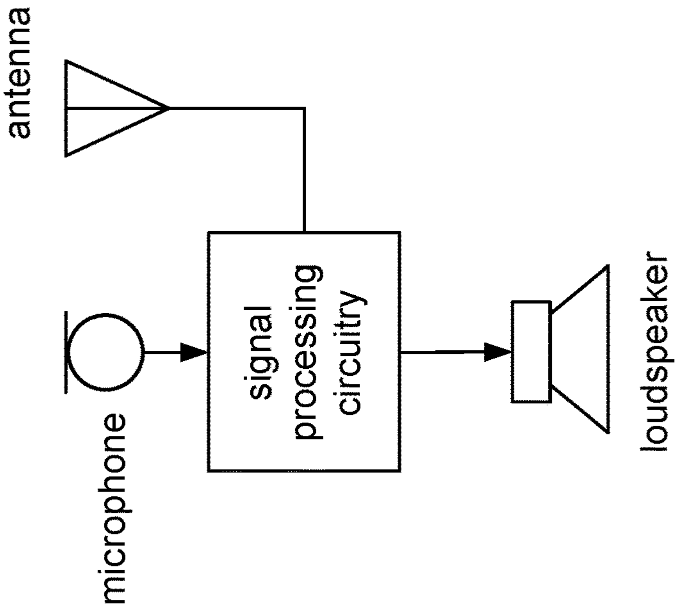
FIG. 1A shows a block diagram of a hardware architecture of a hearable.
Figure 2:
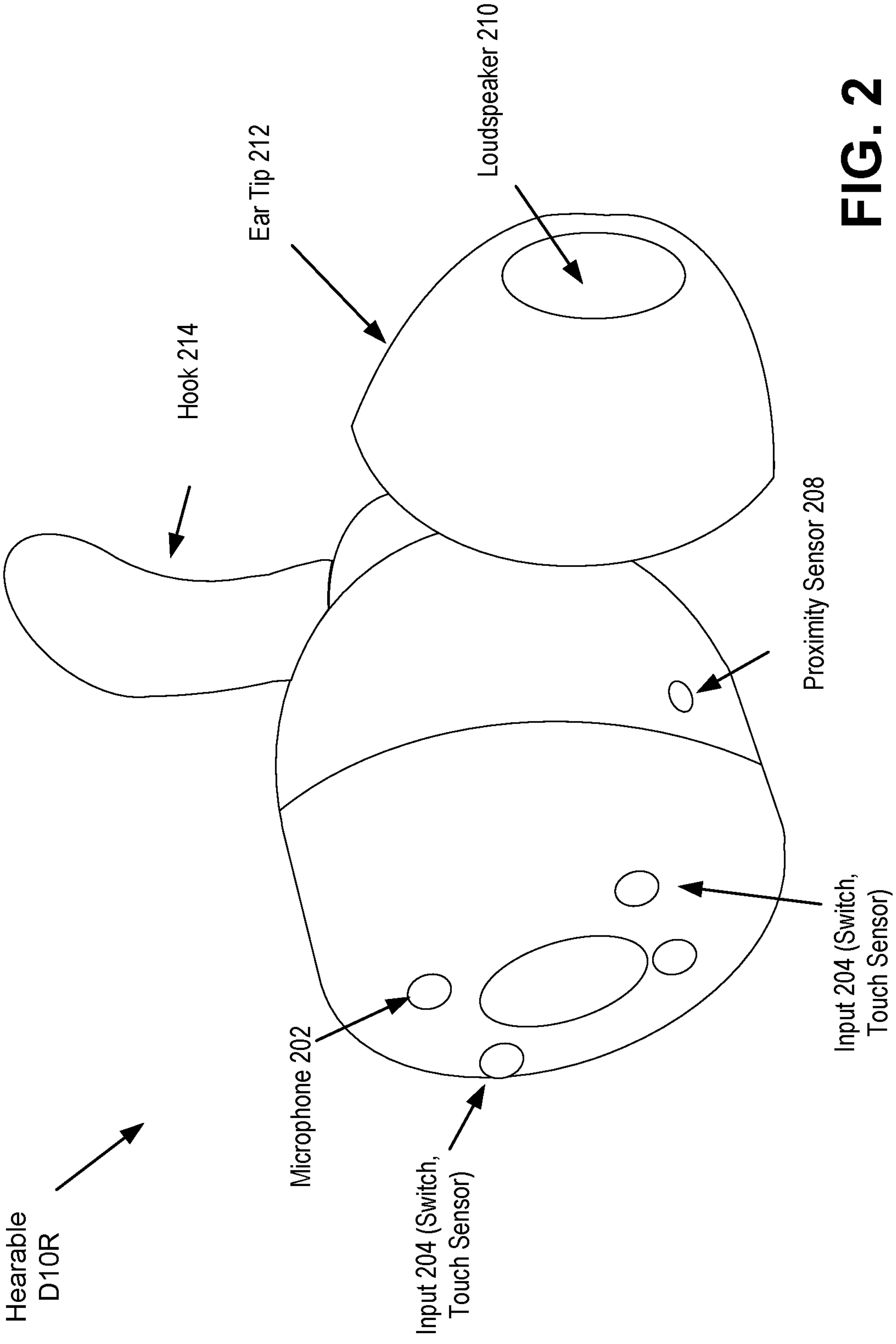
FIG. 2 shows a diagram of an implementation of a hearable.

The principles described herein may be applied, for example, to a hearable, headset, or other communications or sound reproduction device ("personal audio device") that is configured to be worn at a user's ear (e.g., over, on, or in the ear). Such a device may be configured, for example, as an active noise cancellation (ANC, also called active noise reduction) device ("ANC device"). Active noise cancellation is a technology that actively reduces acoustic noise (e.g., ambient noise) by generating a waveform that is an inverse form of a noise wave (e.g., having the same level and an inverted phase), also called an "antiphase" or "anti-noise" waveform. An ANC system generally uses one or more microphones to pick up an external noise reference signal, generates an anti-noise waveform from the noise reference signal, and reproduces the anti-noise waveform through one or more loudspeakers. This anti-noise waveform interferes destructively with the original noise wave (the primary disturbance ("d") at the user's ear) to reduce the level of the noise that reaches the ear of the user.

Active noise cancellation techniques may be applied to personal communications device, such as cellular telephones, and sound reproduction devices, such as headphones and hearables, to reduce acoustic noise from the surrounding environment. In such applications, the use of an ANC technique may reduce the level of background noise that reaches the ear by up to twenty decibels or more while delivering useful sound signals, such as music and far-end voices. In headphones for communications applications, for example, the equipment usually has a microphone and a loudspeaker, where the microphone is used to capture the user's voice for transmission and the loudspeaker is used to reproduce the received signal. In such case, the microphone may be mounted on a boom or on an earcup or earbud (also called an "earplug") and/or the loudspeaker may be mounted in an earcup or earbud. In another example, the microphone is mounted close to the user's ear on an eyewear (of a pair of smart glasses or other head-mounted device or display).

An ANC device usually has a microphone (e.g., an external reference microphone) arranged to generate a reference signal ("x") based on ambient noise and/or a microphone (e.g., an internal error microphone) arranged to generate an error signal ("e") based on sound output after the noise cancellation. In either case, the ANC device uses the microphone input to estimate the noise at that location and produces an anti-noise signal ("y") which is a modified version of the estimated noise. The modification typically includes filtering with phase inversion and may also include gain amplification.

An ANC device typically includes an ANC filter which models an acoustic primary path ("P(z)") between the external reference microphone and the internal error microphone and generates an anti-noise signal that is matched with the acoustic noise in amplitude and is opposite to the acoustic noise in phase. In a typical feedforward design, for example, the reference signal x is modified by passing it through an estimate $\hat{S}(z)$ of a secondary path ("S(z)") (where the secondary path S(z) is an electro-acoustic path from the ANC filter output through, for example, the loudspeaker and the error microphone) to produce an estimated reference x' to be used to adapt a state of the ANC filter (e.g., gain and/or tap coefficient values of the filter). In a typical feedback design, the error signal e is modified to produce the estimated reference x'. The ANC filter is typically adapted according to an implementation of a least-mean-squares (LMS) algorithm, such as a filtered-reference ("filtered-X") LMS algorithm, a filtered-error ("filtered-E") LMS algorithm, a filtered-U LMS algorithm, and variants thereof (e.g., a subband LMS algorithm, a step size normalized LMS algorithm, etc.). Signal processing operations such as time delay, gain amplification, and equalization or lowpass filtering may be performed to improve noise cancellation.

An ANC system can be effective at cancelling ambient noise. Unfortunately, an ANC device can impede the user from hearing desired external sounds, even when the ANC system is not active. When a user is wearing a personal audio device, passive attenuation of the device can make environmental sounds difficult to perceive. A user wearing earcups or earbuds often needs to remove the device to hear announcements or speak with others, even if the ANC system is off, because the device muffles the external sound or obstructs the user's ear canal.

It may be desired to make a personal audio device acoustically transparent, for example, so that the user hears the same thing she would hear if she were not wearing the device. The device may be configured, for example, to transfer external sound into the user's ear canal. Although a device may offer an 'ambient mode' that passes environmental sound into the ear, however, the perception of acoustic transparency may be inadequate, and a user may be compelled to remove the device because the desired perception of acoustic transparency is not being fulfilled.

Several illustrative configurations will now be described with respect to the accompanying drawings, which form a part hereof. While particular configurations, in which one or more aspects of the disclosure may be implemented, are described below, other configurations may be used and various modifications may be made without departing from the scope of the disclosure or of the appended claims. A solution as described herein may be implemented on a chipset.

Figure 3A:
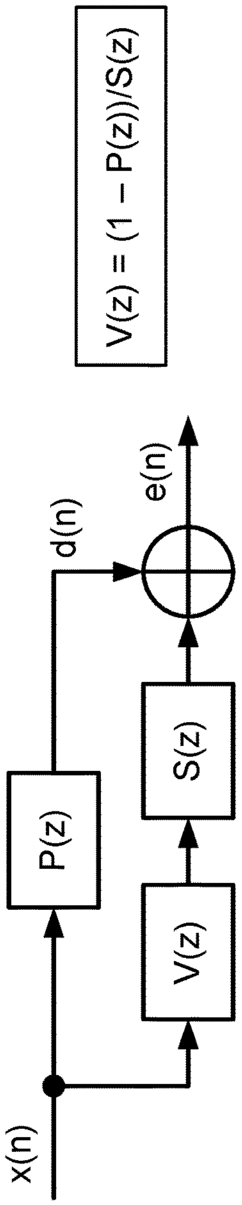
FIG. 3A shows a block diagram of a system that includes a hear-through filter V(z)

One aspect of providing acoustic transparency is to pass through environmental sounds so that the user may hear them as if the device were not being worn. FIG. 3A shows a block diagram of a system in which the external reference signal x(n) (the desired air-conducted environmental sound) is filtered by the primary path P(z) (e.g., the passive attenuation of the device) to produce the primary disturbance d(n) at the user's ear. Because of the passive attenuation, the disturbance that reaches the user's ear does not sound like the external reference signal x(n).

The system of FIG. 3A includes a hear-through filter V(z) that is designed so that its output, after passing through the secondary path S(z), sums with d(n) to provide an acoustically transparent response. As shown in FIG. 3A, the hear-through filter V(z) may be designed (e.g., based on online models of the loudspeaker response and passive attenuation) to have a transfer function of (1−P(z))/S(z) so that the error signal e(n) resembles x(n). The coefficients of V(z) may be computed through an iterative gradient descent algorithm, and the filter modeling the primary path P(z) may be computed using an implementation of the LMS algorithm with the internal and external microphone signals as inputs. This structure may be expected to generate a proper transparent response at times when the acoustic models S(z) and P(z) used to compute the hear-through filter V(z) are sufficiently good estimates of the true time-varying responses S(t,z) and P(t,z).

A second aspect of providing acoustic transparency is that in addition to obstructing environmental sounds, passive attenuation may also affect the user's perception of her own voice ("self-voice"). Such muffling of the air-conducted component of the self-voice due to occlusion of the ear canal is called the "occlusion effect." The occlusion effect is characterized by an underemphasis of high-frequency sound and an overemphasis of low-frequency sound (due, e.g., to conduction through bone and soft tissue), and it may give the user the perception of speaking underwater.

Figure 3B:
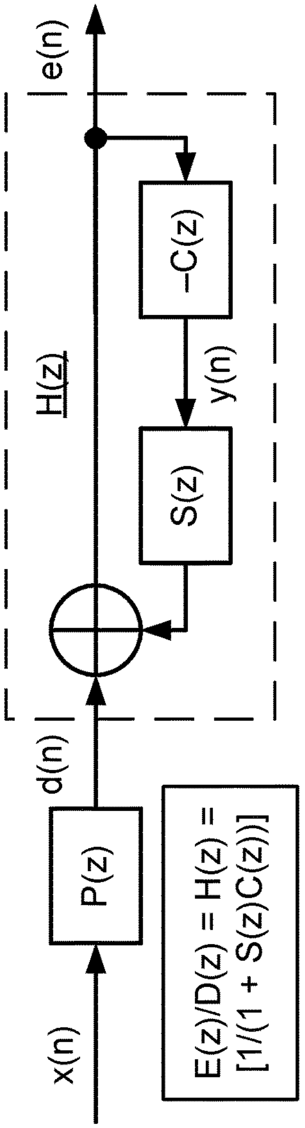
FIG. 3B shows a block diagram of a system that includes a feedback ANC filter −C(z)

In the absence of air-conducted sound (e.g., due to the passive attenuation of the device), the error signal e(n) is primarily the user's self-voice as conducted within the user's head. FIG. 3B shows a block diagram of a system in which a feedback ANC filter −C(z) is used to generate an anti-noise signal y(n) to cancel the error signal e(n). As shown in FIG. 3B, the transfer function of this system from d(n) to e(n) (including the secondary path S(z)) may be characterized as $H(z)=1/[1+C(z)S(z)]$.

Figure 3C:
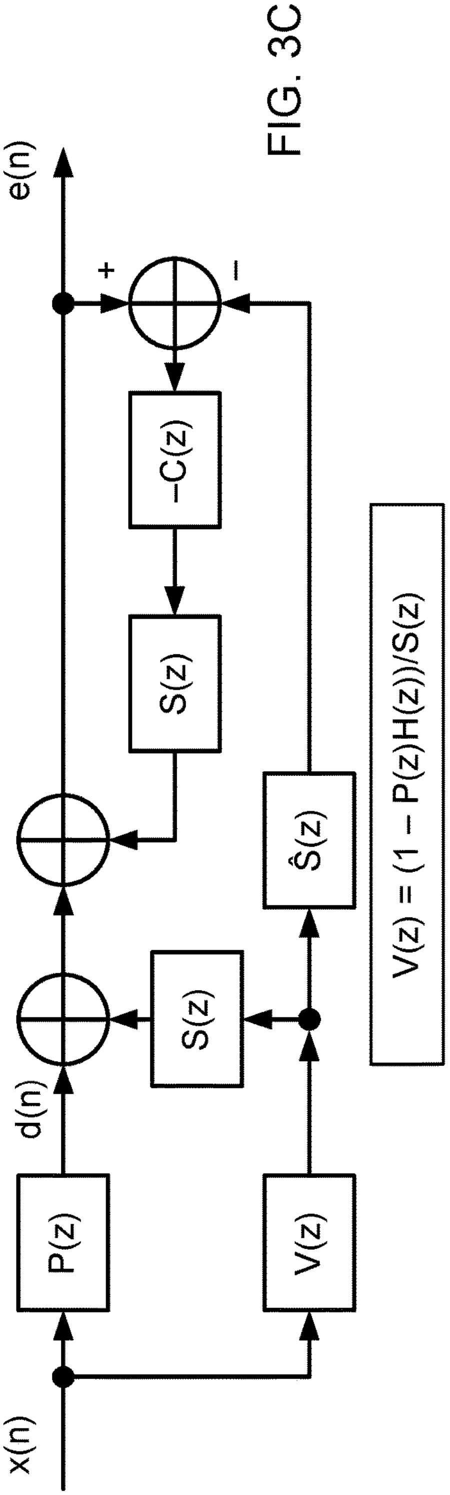
FIG. 3C shows a block diagram of a system that includes a hear-through filter V(z) and a feedback ANC filter −C(z)
Figure 4:
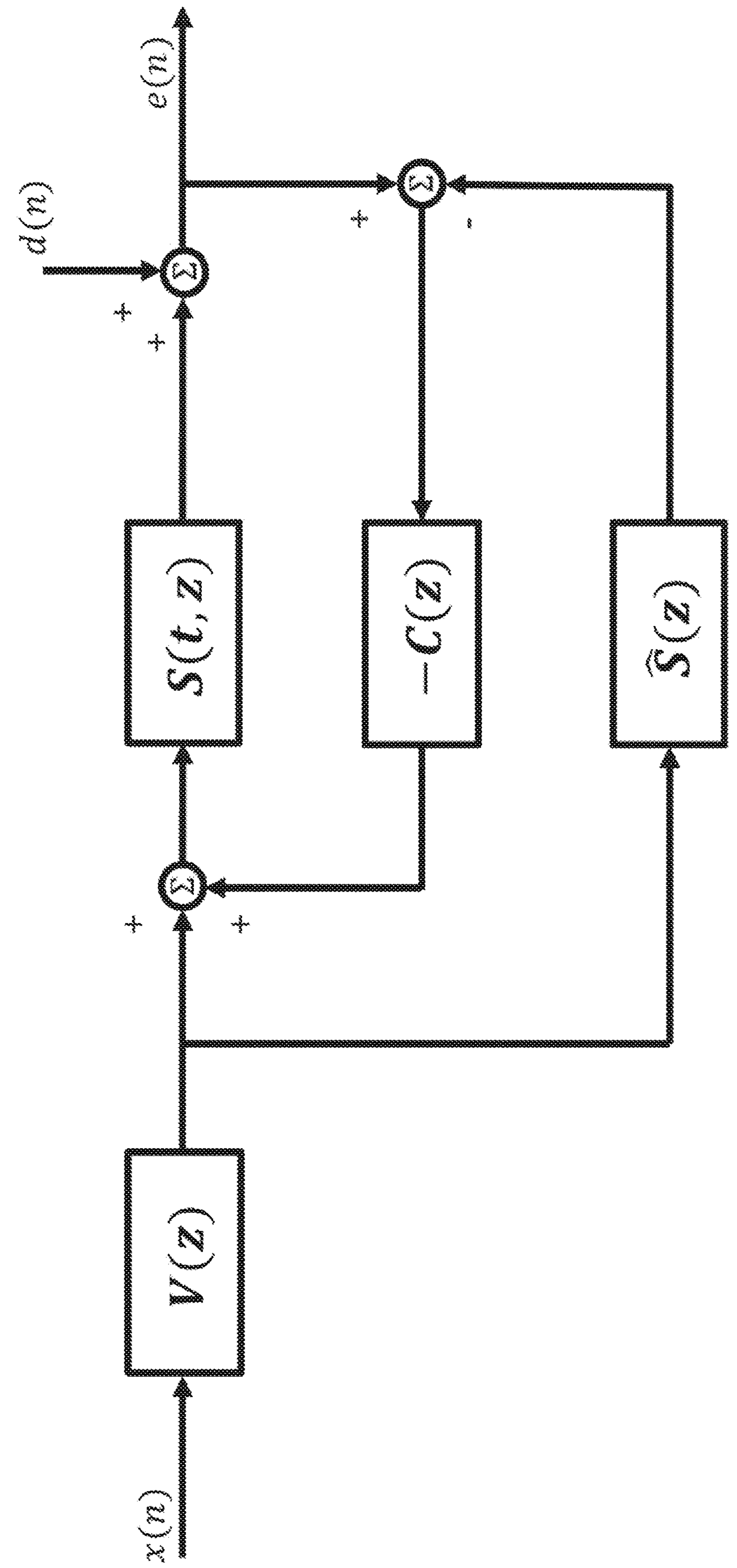
FIG. 4 shows another block diagram of the system of FIG. 3C.
Figure 5A:
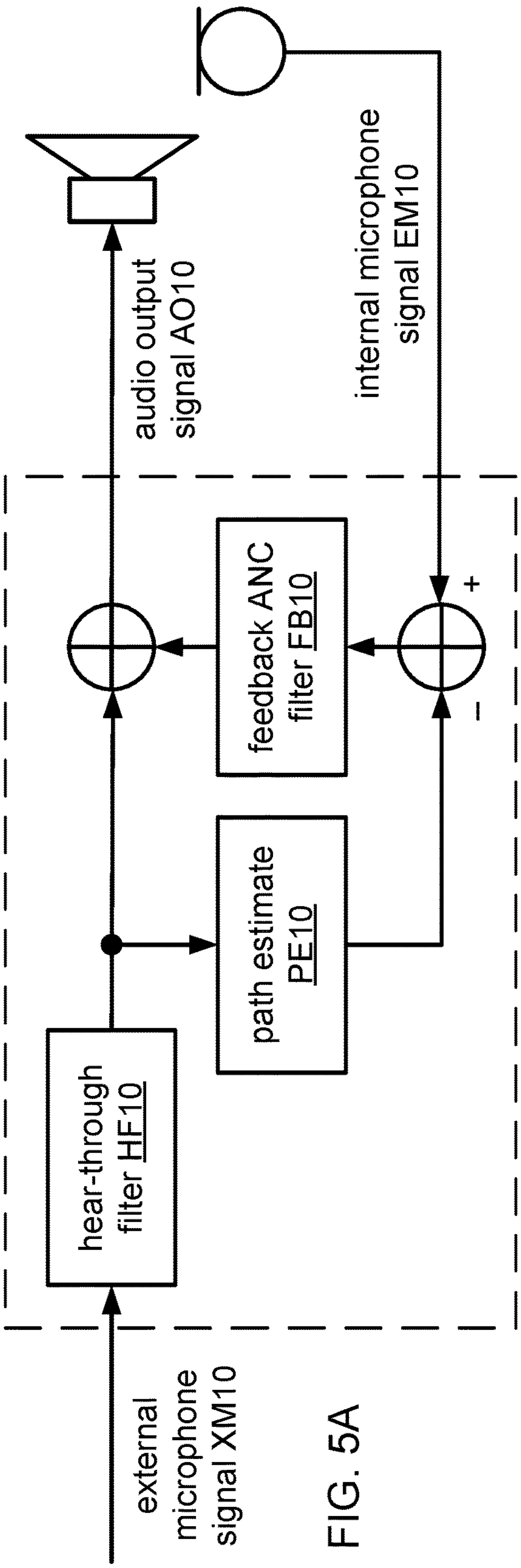
FIG. 5A shows a block diagram of an implementation of a system as shown in FIG. 4.

FIG. 3C shows a block diagram of a system in which the two aspects described above are combined. In FIG. 3C, the hear-through filter V(z) may be designed to have a transfer function of $[1-P(z)H(z)]/S(z)$. In this system, the output of V(z) is filtered by an estimate $\hat{S}(z)$ of the secondary path S(z) and then subtracted from error signal e(n). This path is provided to remove the hear-through component from the signal to be canceled by the feedback ANC filter. In this system, the error signal e(n) resembles x(n) and the user's self-voice as conducted within the user's head can be canceled by the feedback ANC filter. FIG. 4 shows another block diagram of this system, and FIG. 5A shows a block diagram of an implementation of such a system in which the blocks V(z), $\hat{S}(z)$, and −C(z) are implemented by hear-through filter HF10, path estimate PE10, and feedback ANC filter FB10, respectively. In FIG. 5A, an external microphone signal XM10 is filtered by the hear-through filter HF10. An output of the hear-through filter HF10 is modified based on the path estimate PE10 and subtracted from an internal microphone signal EM10 to generate an input to the feedback ANC filter FB10. An output of the feedback ANC filter FB10 is combined with the output of the hear-through filter HF10 to generate an audio output signal AO10 which is used to drive a loudspeaker.

Figure 5B:
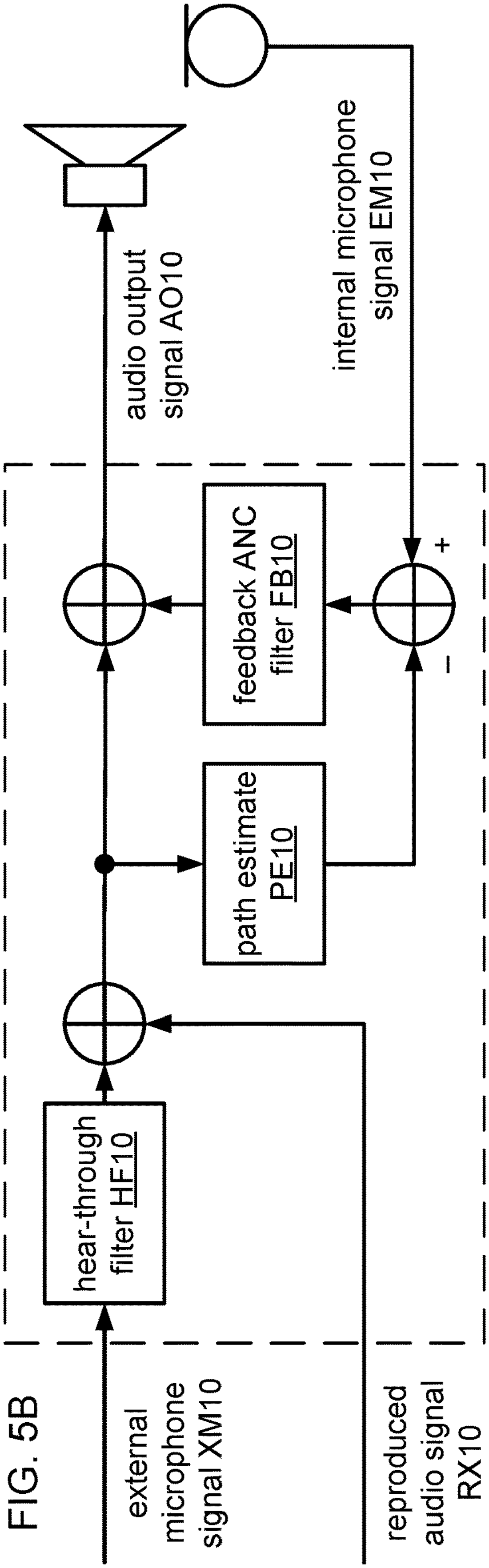
FIG. 5B shows a block diagram of an implementation of a system as shown in FIG. 5A that receives a reproduced audio signal RX10.

It may be desired for the user of a personal audio device to listen to a reproduced audio signal (e.g., a far-end voice communications signal (e.g., a telephone call) or a multimedia signal (e.g., a music signal, which may be received via broadcast or decoded from a stored file or other bitstream)) during an ANC operation or even when in acoustic transparent mode. FIG. 5B shows a block diagram of an implementation of a system as shown in FIG. 5A that includes such a signal RX10.

A system as shown in FIGS. 3C, 4, 5A, and/or 5B may be effective when the estimates of primary path P(z) and secondary path S(z) upon which V(z) is based are accurate. These paths vary over time, however, and they are better represented as P(t,z) and S(t,z). Even minor variations in how an earbud is fit, for example, may cause the secondary path S(t,z) to change significantly. A solution that is designed to work best in one scenario, and acceptably in many scenarios, therefore, may nevertheless fail to provide a desired result in an individual case.

Earbuds do not fit everyone the same, and variation of fit is especially true in the case of earbuds that do not use a silicone tip to seal the ear canal (non-occluded earbuds). The result may be inconsistent or inadequate levels of acoustic transparency for different users. Even for the same user, the fit may vary over time: for example, while talking or exercising. In such cases, although the fit may be good to start with, movement may cause the fit to change over time and result in inconsistent performance.

It may be desired to adapt the coefficients of a hear-through filter based on the external and internal microphone signals. For example, the adaptation may be designed to cause the internal microphone signal to equal the external microphone signal even when the acoustic transfer functions change (e.g., to account for variations in fit).

Figure 6:
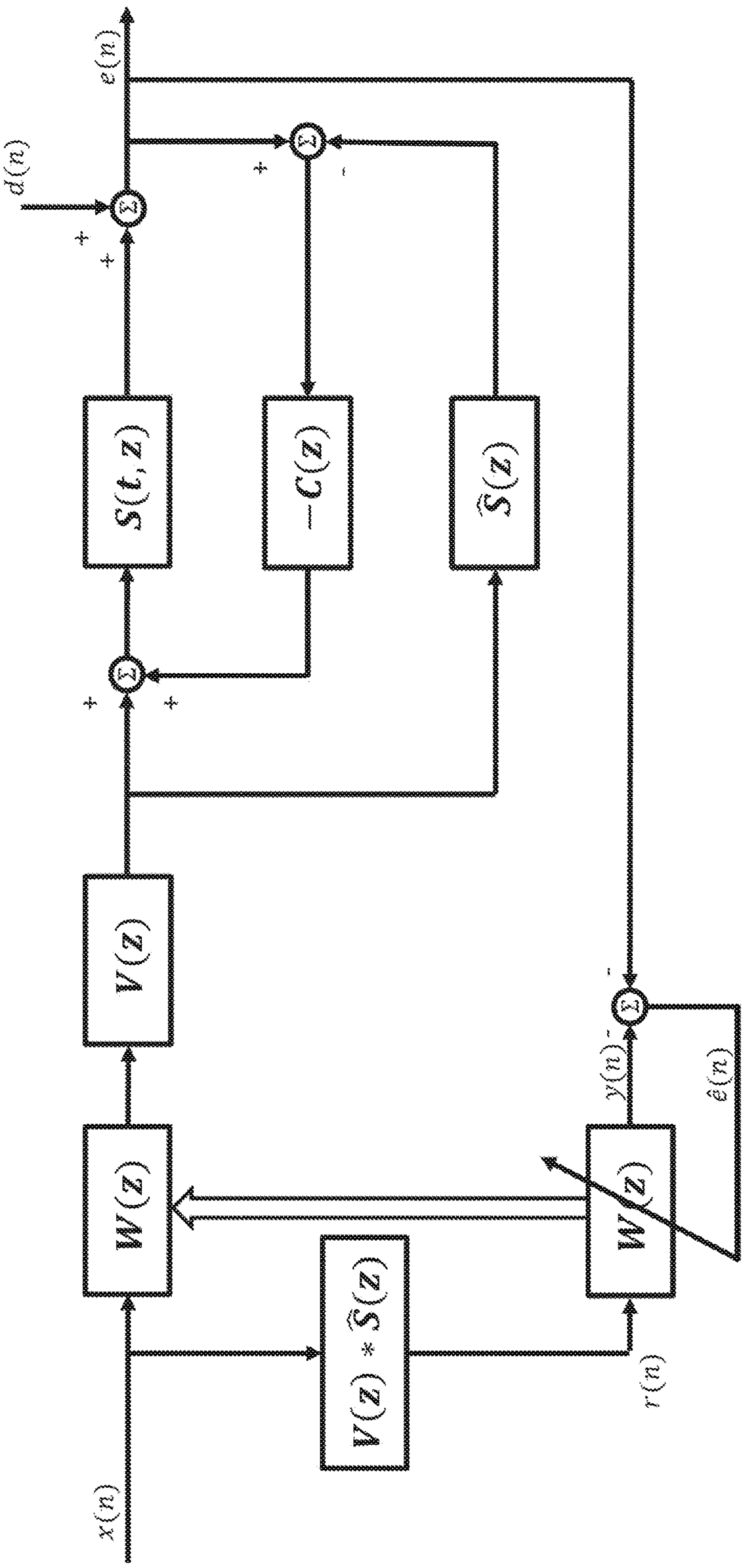
FIG. 6 shows a block diagram of an implementation of the system of FIG. 4.

FIG. 6 shows a block diagram of an implementation of the system of FIG. 4 in which the hear-through filter has a fixed portion V(z) as described above and also an adaptive portion. The adaptive portion includes an adaptive filter W(z), whose state is updated based on the reference signal x(n) and the error signal e(n).

The adaptive portion includes an adaptation block, and a pre-filter $V(z)*\hat{S}(z)$ that presents the adaptation block with a signal r(n). The pre-filter ensures that the inputs to the adaptive filter are time-aligned, and the signal r(n) represents the hear-through component in the absence of W(z) (and assuming that $\hat{S}(z)=S(z)$).

The adaptation block filters r(n) to produce a result y(n), and the state of W(z) is updated based on a difference between the result y(n) and error signal e(n). In this example, the state of W(z) is updated according to the rule $w(n+1)=w(n)-\mu r(n)[e(n)-y(n)]$, where $\mu$ is a step factor. The updated state of W(z) is then used to update the state of a filter in the processing path of x(n) (i.e., upstream of fixed filter V(z), or at the output of V(z)).

Convergence of the adaptive filter W(z) to unity would imply, for example, that there is no fit variation and that the static hear-through filter V(z) achieves perfect acoustic transparency. A solution as shown in FIG. 6 may become particularly effective when the secondary path S(t,z) changes such that $\hat{S}(z)$ is not equal to S(t,z), and such a system may provide more consistent levels of acoustic transparency in the face of changing acoustic transfer functions due to fit variations.

Figure 7A:
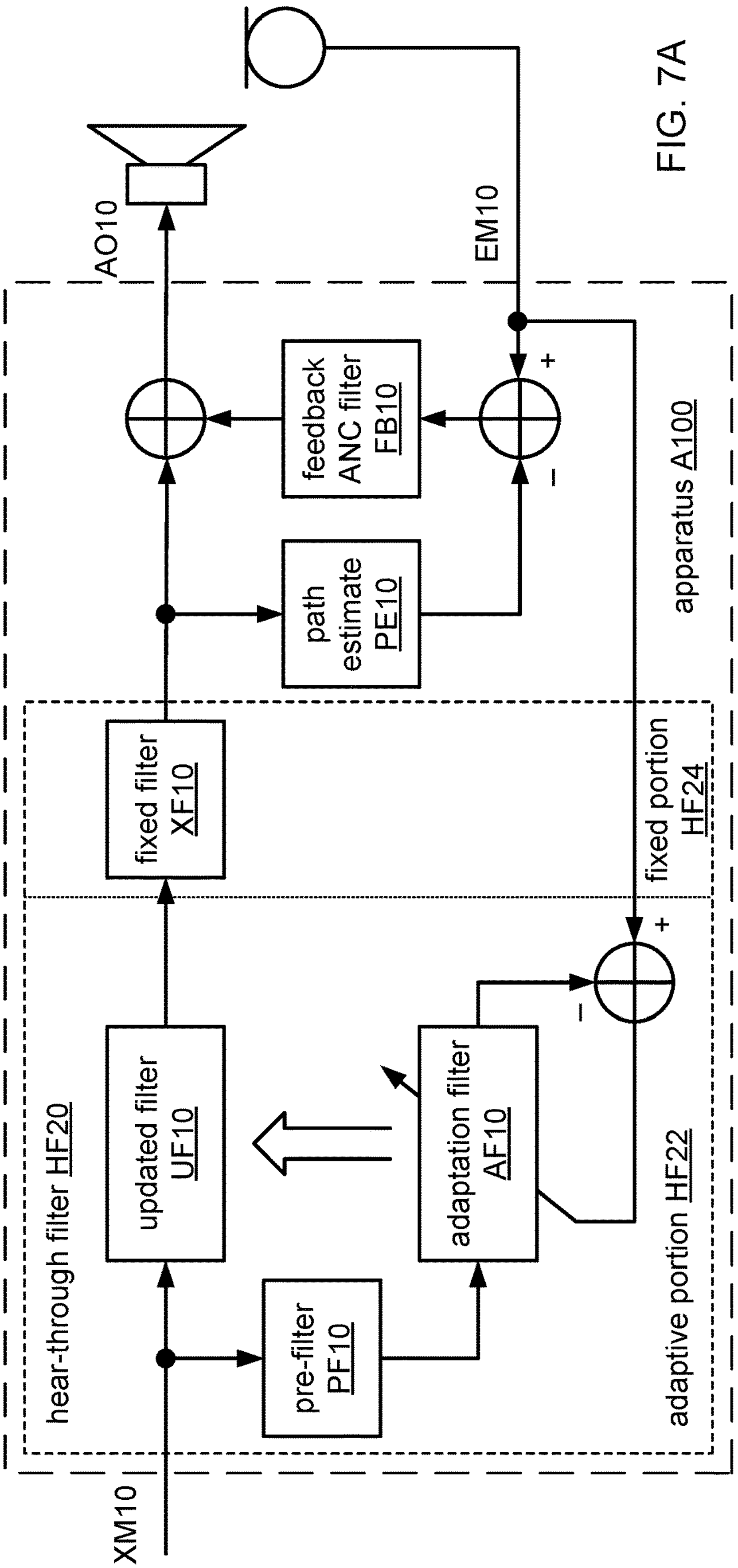
FIG. 7A shows a block diagram of an implementation of a system as shown in FIG. 6 that includes an apparatus A100 according to a particular configuration.

FIG. 7A shows a block diagram of an implementation of a system as shown in FIG. 6 that includes features as shown in FIG. 5A and an apparatus A100 according to a particular configuration. Apparatus A100 includes the path estimate PE10 and the feedback ANC filter FB10 described with reference to FIG. 5A. The apparatus A100 also includes a hear-through filter HF20, which is an implementation of the hear-through filter HF10 of FIG. 5A. In FIG. 7A, the hear-through filter HF20 has a fixed portion HF24 and an adaptive portion HF22. The fixed portion HF24 includes a fixed filter XF10 (e.g., an implementation of hear-through filter HF10 as described above). The adaptive portion HF22 includes an updated filter UF10 whose state is updated, based on the external microphone signal XM10 and the internal microphone signal EM10, according to an adaptation performed by an adaptation filter AF10.

Figure 7B:
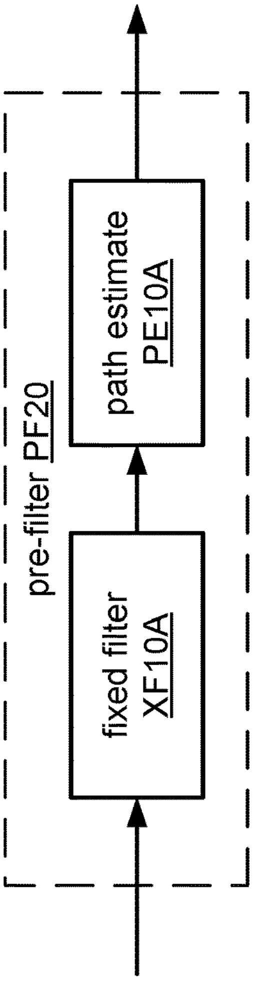
FIG. 7B shows a block diagram of an implementation PF20 of pre-filter PF10.

The adaptive portion HF22 also includes a pre-filter PF10 that presents the adaptation filter AF10 with a signal that represents the hear-through component in the absence of the adaptive portion (and assuming that the transfer function of path estimate PE10 is the same as the transfer function of secondary path S(z)). FIG. 7B shows a block diagram of an example of a pre-filter PF20 that corresponds to a particular implementation of the pre-filter PF10 of FIG. 7A. In FIG. 7B, the pre-filter PF20 uses a cascade of a fixed filter XF10A (which is an instance of the fixed filter XF10) and a path estimate PE10A (which is an instance of the path estimate PE10).

Returning to FIG. 7A, the adaptation filter AF10 filters the output of the pre-filter PF10 to produce a filtered result, and the state of the adaptation filter AF10 is updated based on a difference between the filtered result and the internal microphone signal EM10 (e.g., according to a rule as described above with reference to filter W(z)). The updated state of adaptation filter AF10 is then used to update the state of updated filter UF10. In another implementation, updated filter UF10 is placed at the output of fixed filter XF10 prior to the branch to path estimate PE10.

For a case in which acoustic transfer functions are time-varying (e.g., a case in which variations of fit of an earbud occur), the response of hear-through filter HF20 may also be expected to be time-varying. By including an auxiliary filter (e.g., the updated filter UF10) in series with the hear-through response, the output of the cascade of filters XF10 and UF10 can track variations in acoustic transfer functions.

There is no particular requirement on the structure of updated filter UF10. For example, updated filter UF10 may have a finite impulse response (FIR) or an infinite impulse response (IIR). The adaptation filter AF10 may be configured to adapt the coefficients of updated filter UF10 at a lower rate than a rate at which the adaptation filter AF10 coefficients are updated and/or in a background process. The adaptation filter AF10 may be configured to update the coefficient values of the update filter UF10 by copying the current state of the adaptation filter AF10 into the updated filter UF10.

The state of the updated filter UF10 (e.g., the values of its tap coefficients) may be updated periodically: for example, according to a time interval (e.g., one second, one-half second, one-quarter second, or one-tenth of a second) and/or upon an event. The adaptation filter AF10 may be configured, for example, to copy the updated coefficient values into the updated filter UF10 (for application to the signal path) only after a convergence criterion and/or (in the case of an IIR implementation) a stability criterion has been reached.

Figure 8B:
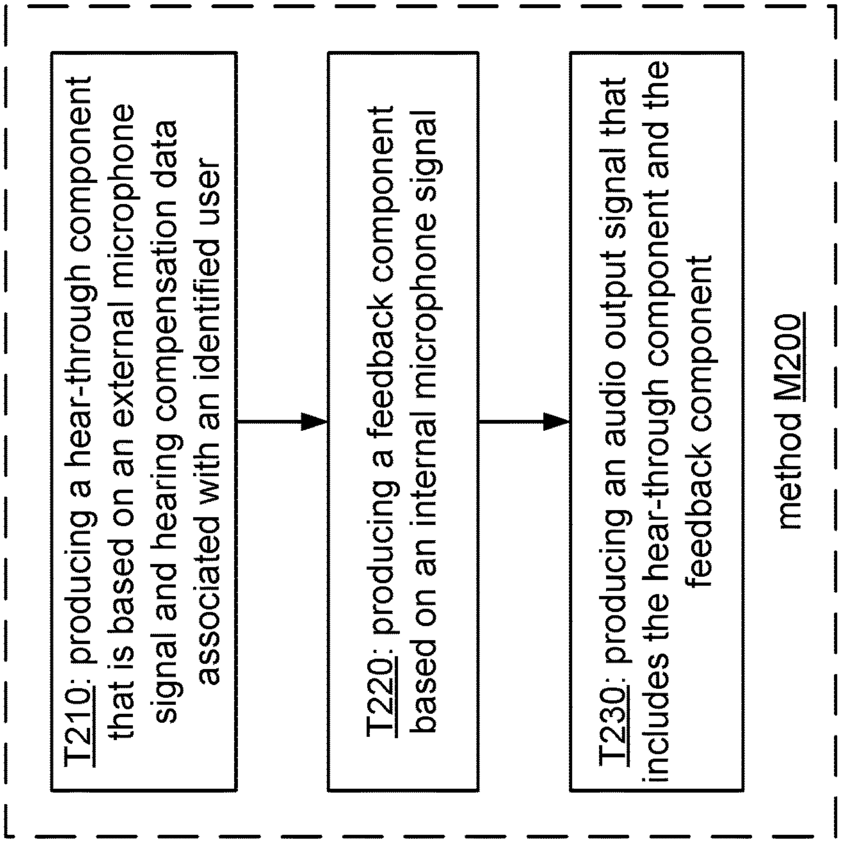
FIG. 8B shows a flow diagram of a method M200 according to a particular configuration.
Figure 8A:
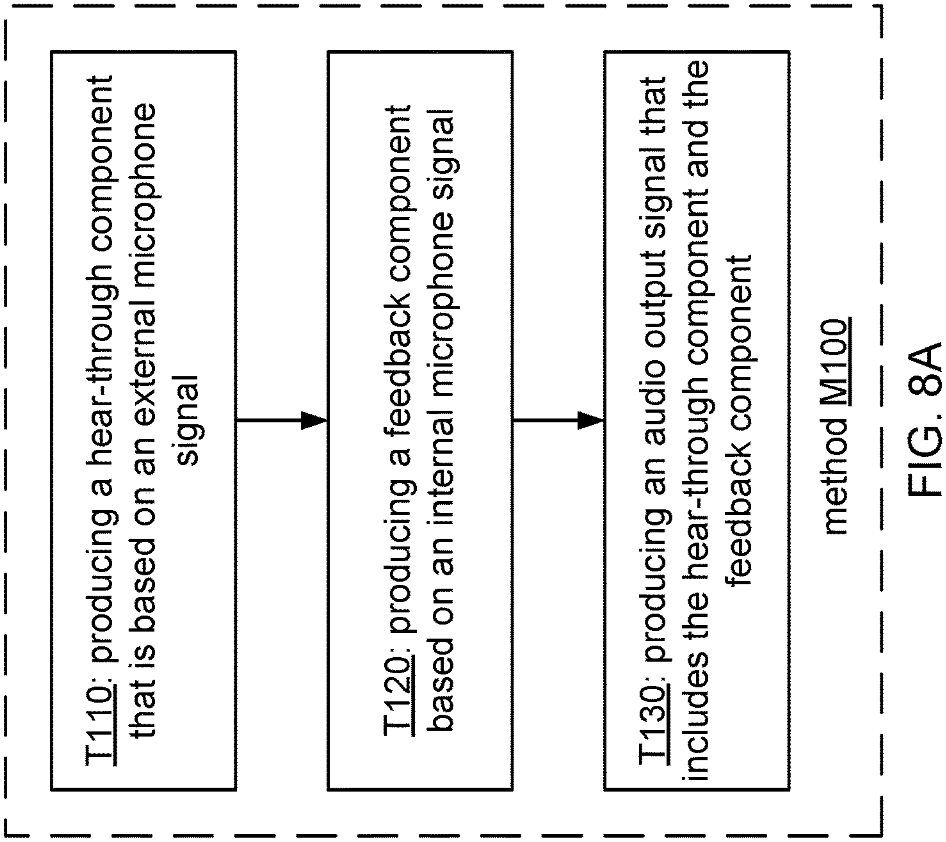
FIG. 8A shows a flow diagram of a method M100 according to a particular configuration.

FIG. 8A shows a flow diagram of a method M100 of audio signal processing that includes tasks T110, T120, and T130. Task T110 produces a hear-through component that is based on an external microphone signal (e.g., as described above with reference to hear-through filter HF20). Task T120 produces a feedback component based on an internal microphone signal (e.g., as described above with reference to feedback ANC filter FB10). Task T130 produces an audio output signal that includes the hear-through component and the feedback component (e.g., by mixing signals produced by tasks T110 and T120). In this method, a relation between the external microphone signal and the hear-through component varies in response to a change in a relation between the audio output signal and the internal microphone signal (e.g., a change in acoustic coupling between a loudspeaker that produces an acoustic signal based on the audio output signal and an internal microphone arranged to produce the internal microphone signal in response to the acoustic signal, wherein said acoustic coupling may vary as a result of e.g., fit variations).

A device (e.g., a hearable) may be implemented to include a memory configured to store audio data, and a processor configured to receive the audio data from the memory and to perform method M100. An apparatus may be implemented to include means for performing each of tasks T110, T120, and T130 (e.g., as software executing on hardware). A computer-readable storage medium may be implemented to include code which, when executed by at least one processor, causes the at least one processor to perform method M100.

Another reason why a user may experience a suboptimal feeling of acoustic transparency is that not everyone hears the same. Each individual's hearing profile has its own unique deficiencies, which may differ from one ear to the other. A design by default that works best in one scenario, and acceptably in many scenarios, may not be suitable for a user's own natural hearing profile.

It may be desired to support individualized transparent mode designs. For example, it may be desired to provide acoustic transfer functions and/or system models that are tailored for an individual's own hearing profile.

Figure 9:
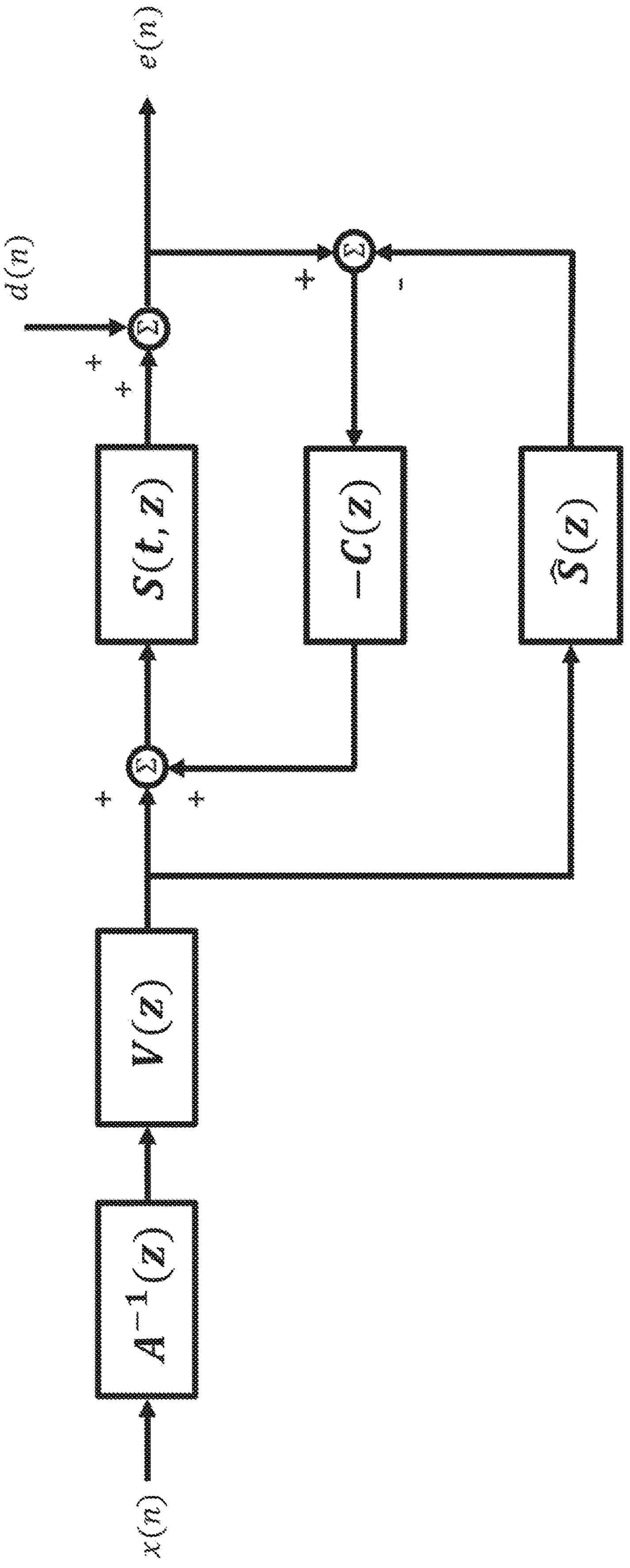
FIG. 9 shows a block diagram of an implementation of the system of FIG. 4.

FIG. 9 shows a block diagram of an implementation of the system of FIG. 4 that includes a compensation filter (also called a "shaping filter") in the hear-through filter path. The compensation filter has a transfer function $A^{-1}(z)$ that is selected to compensate for an individual's unique hearing deficiencies. The compensation filter may be implemented as a pre-filter as shown in FIG. 9 or may be applied to the output of the hear-through filter V(z) (prior to the branch to the secondary path estimate $\hat{S}(z)$). Such a system may be used to provide a perception of acoustic transparency for a user having an imperfect hearing profile.

The response of the compensation filter may be based on the user's audiogram, which records a curve that describes the individual's hearing deficiency profile A(ω). A user's audiogram may include separate results for each ear. Additionally, an audiogram may indicate how a user perceives sound (at various frequencies) via air conduction and/or via bone conduction. Thus, a complete user audiogram may indicate user perception, at the right ear, of various frequencies of sound conducted in air and of various frequencies of sound conducted in bone and user perception, at the left ear, of various frequencies of sound conducted in air and of various frequencies of sound conducted in bone. Bone conduction testing may be performed using a device that is placed behind the ear in order to transmit sound through the vibration of the mastoid bone.

Figure 10:
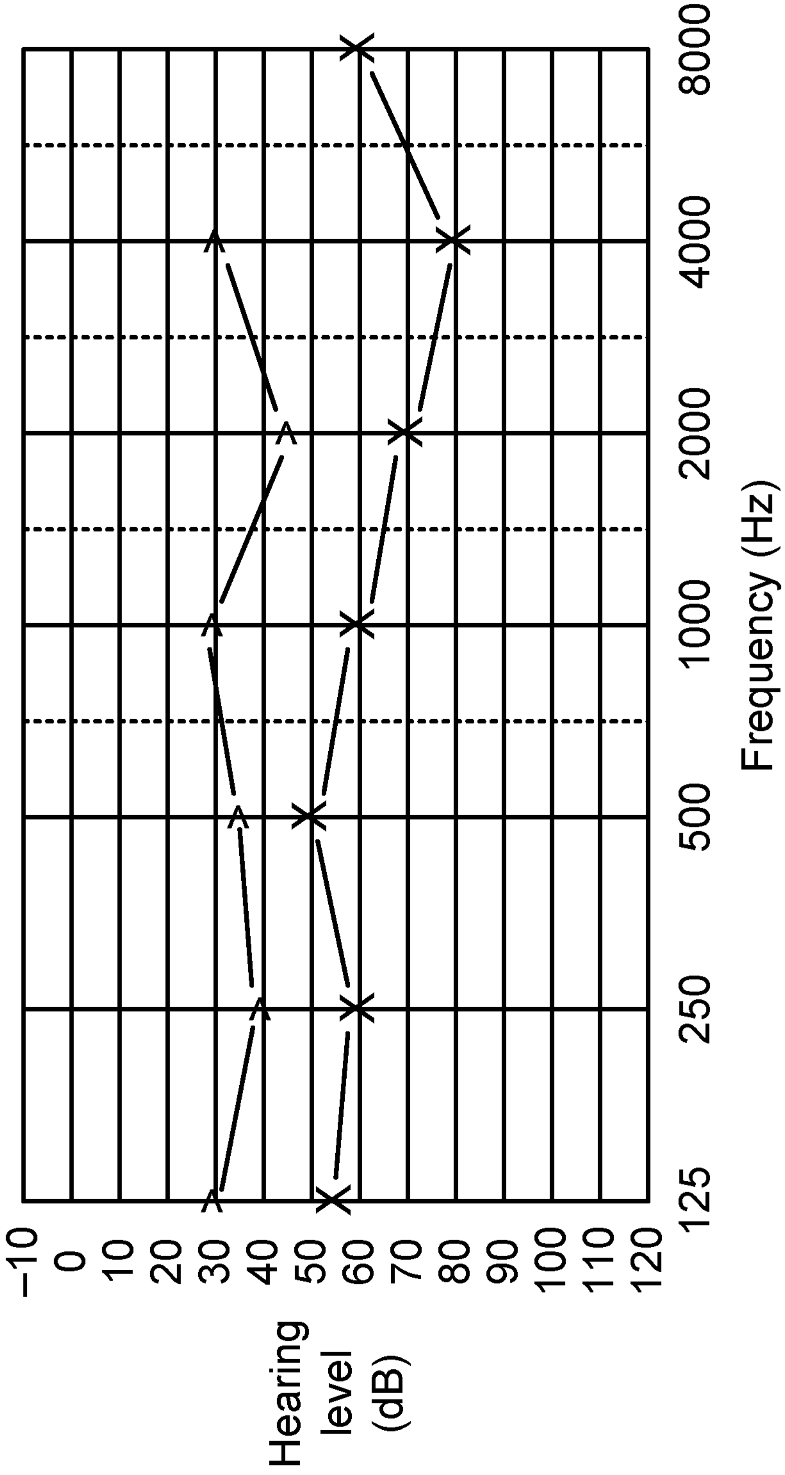
FIG. 10 shows an example of an audiogram for a user's left ear.

FIG. 10 shows an example of an audiogram for a user's left ear. This example shows a loss of 30 to 45 dB for bone-conducted sounds, with a pronounced deficiency at 2 kHz, and a total (including bone-conduct and air-conducted) hearing loss of 50 to 80 dB, with a pronounced deficiency at 4 kHz.

In a particular implementation, the total hearing loss audiogram curve may be inverted to obtain the transfer function $A^{-1}(z)$ for the compensation filter in order to compensate the response by providing higher levels in bands where the user's hearing is degraded. In other implementations, an air-conducted hearing loss audiogram curve may be inverted to obtain the transfer function $A^{-1}(z)$ for the compensation filter. For example, the air-conducted audiogram curve can be determined via testing, or the bone-conducted audiogram curve can be subtracted from the total hearing loss audiogram curve to determine the air-conducted audiogram curve. Such a system may support a perceptually acoustic transparent response even for individuals with imperfect hearing, assuming that a suitable audiogram is available.

In one example, an application (executing, for example, on a smartphone or tablet that is linked to the personal audio device) is used to obtain the user's audiogram, e.g., via manual data entry or by querying another device. In another example, the application is used to measure the user's audiogram. After the user's audiogram is obtained or generated (e.g. measured), data descriptive of the user's audiogram (or the inverted audiogram) may be stored in a memory (e.g., of the personal audio device or another device) and used to configure the compensation filter. For example, the user's audiogram may be obtained at first device (e.g., a computer, tablet, or smartphone) and the data descriptive of the user's audiogram may be uploaded (e.g., via a wired or wireless data link, such as a Bluetooth® data link) to the personal audio device to configure the compensation filter (Bluetooth is a registered trademark of BLUETOOTH SIG, INC. of Kirkland, Washington, USA). For example, the application may perform a series of tests in which it causes a sound to be played at a particular intensity and frequency at the left ear or the right ear, while directing the user to tap a designated part of the touchscreen to indicate at which ear (if any) a sound is perceived.

Figure 11A:
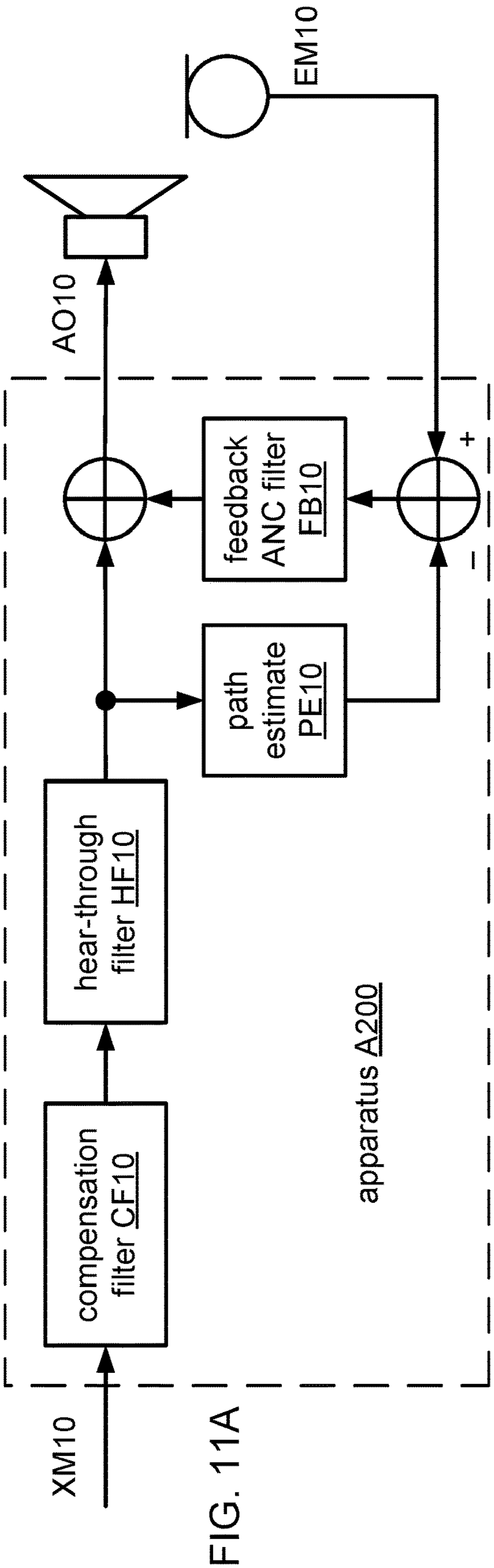
FIG. 11A shows a block diagram of an implementation of a system as shown in FIG. 9 that includes an apparatus A200 according to a particular configuration.

FIG. 11A shows a block diagram of an implementation of a system as shown in FIG. 9 that includes features as shown in FIG. 5A and an apparatus A200 according to a particular configuration. In addition to the features shown in FIG. 5A, apparatus A200 includes a compensation filter CF10 which has a transfer function that is selected to compensate for an individual's unique hearing deficiencies (e.g., an inverse of the user's audiogram as described herein). Compensation filter CF10 may be implemented as a pre-filter as shown in FIG. 11A or may be applied to the output of hear-through filter HF10 (prior to the branch to path estimate PE10).

Figure 11B:
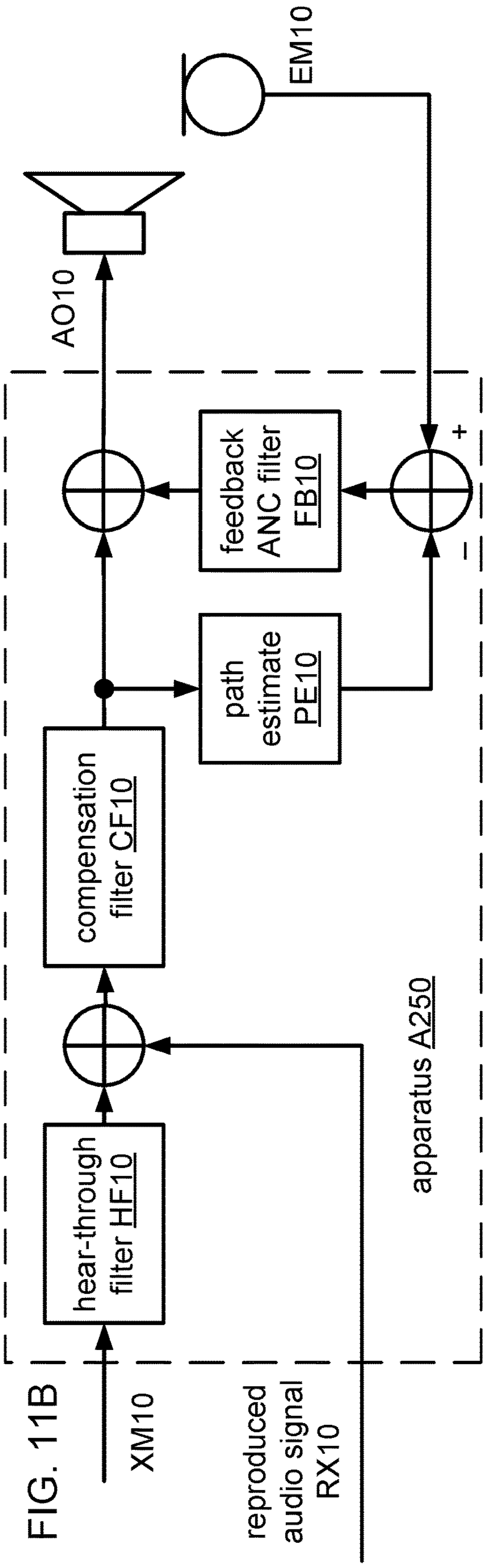
FIG. 11B shows a block diagram of an apparatus A250 corresponding to another implementation of apparatus A200.

Apparatus A200 may also be configured to receive a reproduced audio signal RX10 (e.g., as shown in FIG. 5B). FIG. 11B shows a block diagram of an apparatus A250, which corresponds to an implementation of apparatus A200 in which the reproduced audio signal RX10 is inserted into the hear-through path upstream of compensation filter CF10, such that the compensation is also applied to signal RX10.

Figure 12:
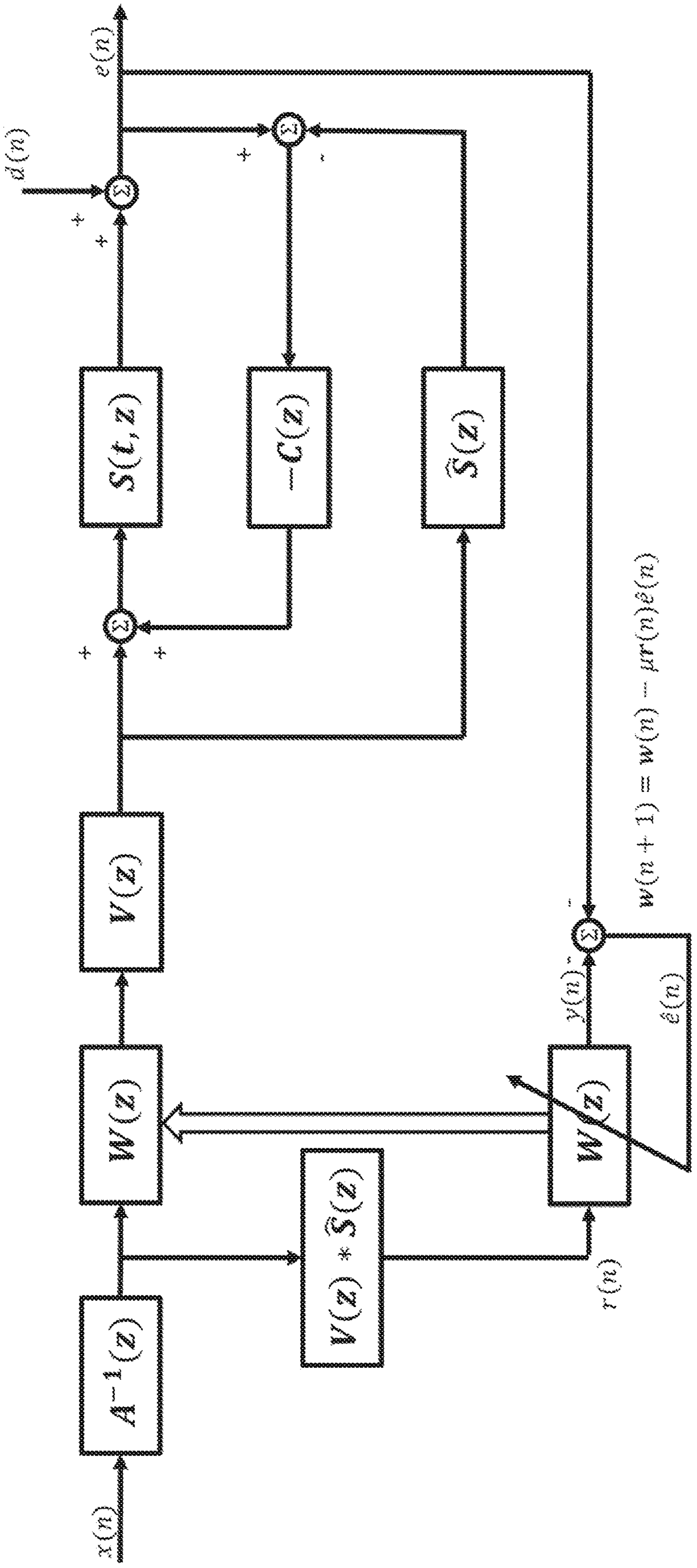
FIG. 12 shows a block diagram of an implementation of a system as shown in FIG. 9.
Figure 13:
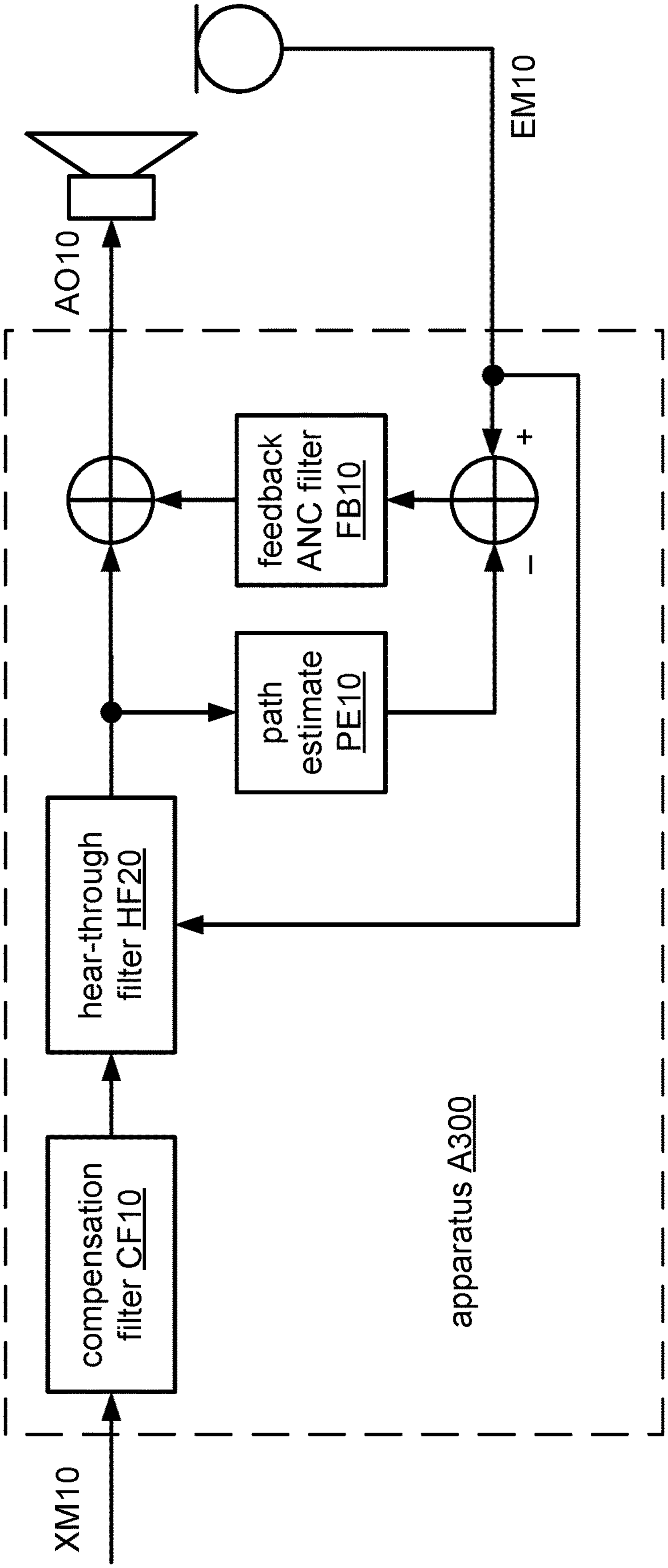
FIG. 13 shows a block diagram of an apparatus A300 corresponding to apparatuses A100 and A200.

FIG. 12 shows a block diagram of an implementation of a system as shown in FIG. 9 that also includes an adaptive filter W(z) (and associated pre-filter) as shown in FIG. 6. FIG. 13 shows a block diagram of an apparatus A300 that includes aspects of apparatuses A100 and A200.

FIG. 8B shows a flowchart of a method M200 according to a particular configuration that includes tasks T210, T220, and T230. Task T210 produces a hear-through component that is based on an external microphone signal (e.g., as described above with reference to hear-through filter HF10) and on hearing compensation data associated with an identified user (e.g., as described above with reference to compensation filter CF10). Task T220 produces a feedback component based on an internal microphone signal (e.g., as described above with reference to feedback ANC filter FB10). Task T230 produces an audio output signal that includes the hear-through component and the feedback component (e.g., by mixing signals produced by tasks T210 and T220). Method M200 may also be implemented as an implementation of method M100, such that a relation between the external microphone signal and the hear-through component varies in response to a change in a relation between the audio output signal and the internal microphone signal (e.g., a change in acoustic coupling between a loudspeaker that produces an acoustic signal based on the audio output signal and an internal microphone arranged to produce the internal microphone signal in response to the acoustic signal, wherein said acoustic coupling may vary as a result of e.g., fit variations).

A device (e.g., a hearable) may be implemented to include a memory configured to store audio data, and a processor configured to receive the audio data from the memory and to perform method M200. An apparatus may be implemented to include means for performing each of tasks T210, T220, and T230 (e.g., as software executing on hardware). A computer-readable storage medium may be implemented to include code which, when executed by at least one processor, causes the at least one processor to perform method M200.

It may be desired for the personal audio device to support such individualized hearing compensation for more than one user. For example, the device may be configured to record and store hearing compensation data, such as hear-through compensation filter states (e.g., filter coefficient values), for each of a set of enrolled users. Upon or during use, the device may select the hearing compensation data (e.g., the hear-through compensation filter state) that corresponds to the current user based on, for example, authentication of the user. To illustrate, the user may be authenticated using biometric authentication techniques such as voice authentication, fingerprint recognition, iris recognition and/or face recognition. Selection of hearing compensation data based on user authentication may be incorporated into any of the systems shown, for example, in FIG. 9, 11A, 11B, 12, or 13.

Figure 14:
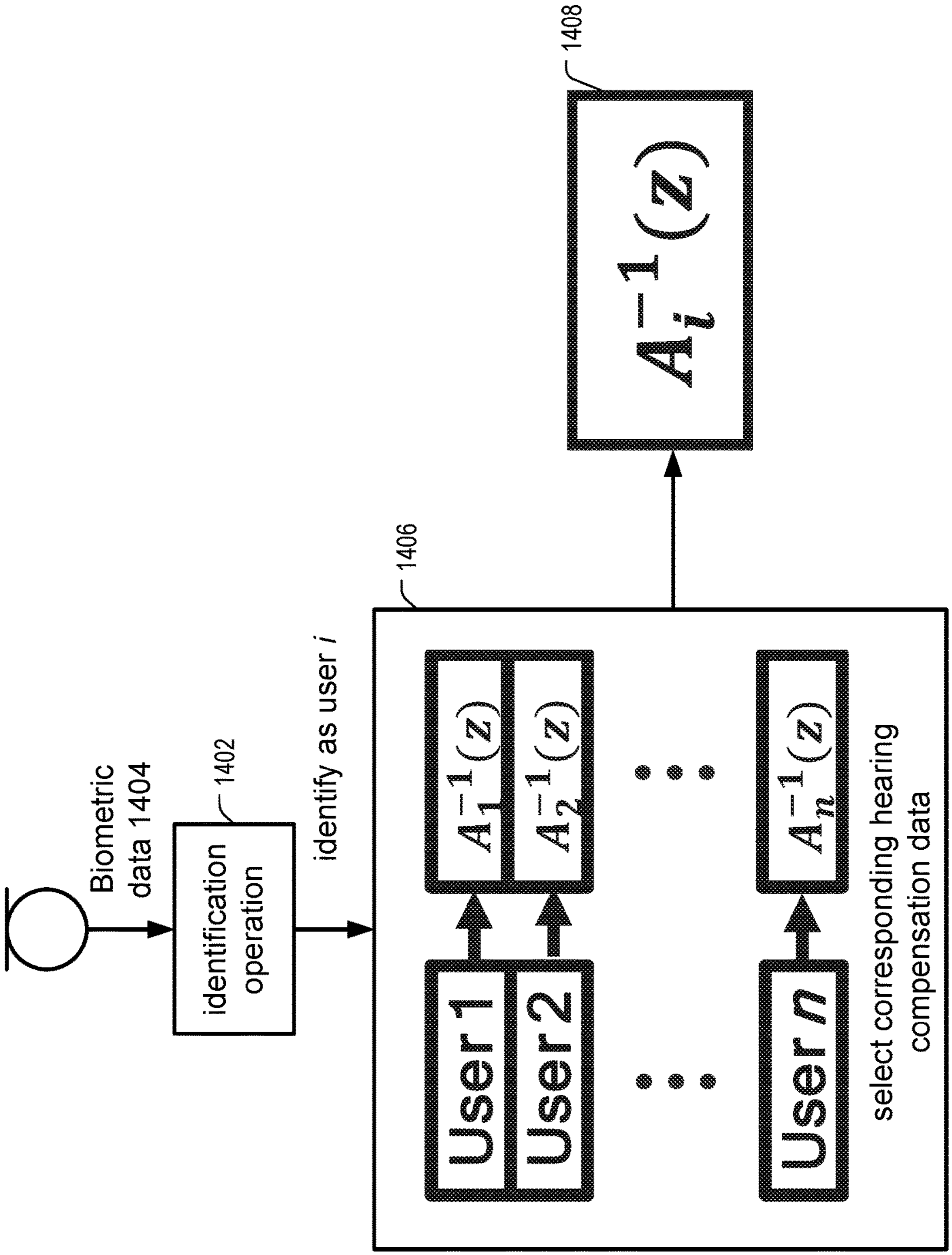
FIG. 14 shows a flow diagram for an operation to select a hear-through compensation filter state (e.g., hearing compensation data) based on biometric authentication of a user.

FIG. 14 shows a flow diagram for an operation to select hearing compensation data (e.g., a hear-through compensation filter state) based on biometric data identifying or authenticating a user. An identification operation 1402 receives a signal or request that includes biometric data 1404, such as a sample of the user's voice (e.g., based on external microphone signal XM10, internal microphone signal EM10, or a combination of both) and identifies the user as user i among a set of n enrolled users. An indication of the identification i is used, at operation 1406, to select the corresponding hearing compensation data 1408 from among a set of n stored hearing compensation data. In FIG. 14, the stored hearing compensation data includes a filter state for each enrolled user, and the selected hearing compensation data 1408 is copied into the compensation filter (e.g., compensation filter CF10). In some implementations, if the stored hearing compensation data does not include hearing compensation data associated with the particular user, a processor may execute the instructions to add hearing compensation data for the particular user to the set of hearing compensation data. For example, the processor may prompt the particular user to provide an audiogram (either by selecting a previously generate file or by testing the user's hearing) and may generate the hearing compensation data for the particular user based on the user's response to the prompt.

As one example, the biometric authentication may include voice authentication operation, which may be implemented as a classification of the voice signal over the enrolled users. In one example, the voice signal is a specified keyword, which the user may speak to initiate the compensation filter selection operation. Such an operation may be configured to classify the voice signal using, for example, a deep neural network (DNN). In another example, the voice authentication operation is configured to classify the user's self-voice regardless of the words being spoken.

Figure 15:
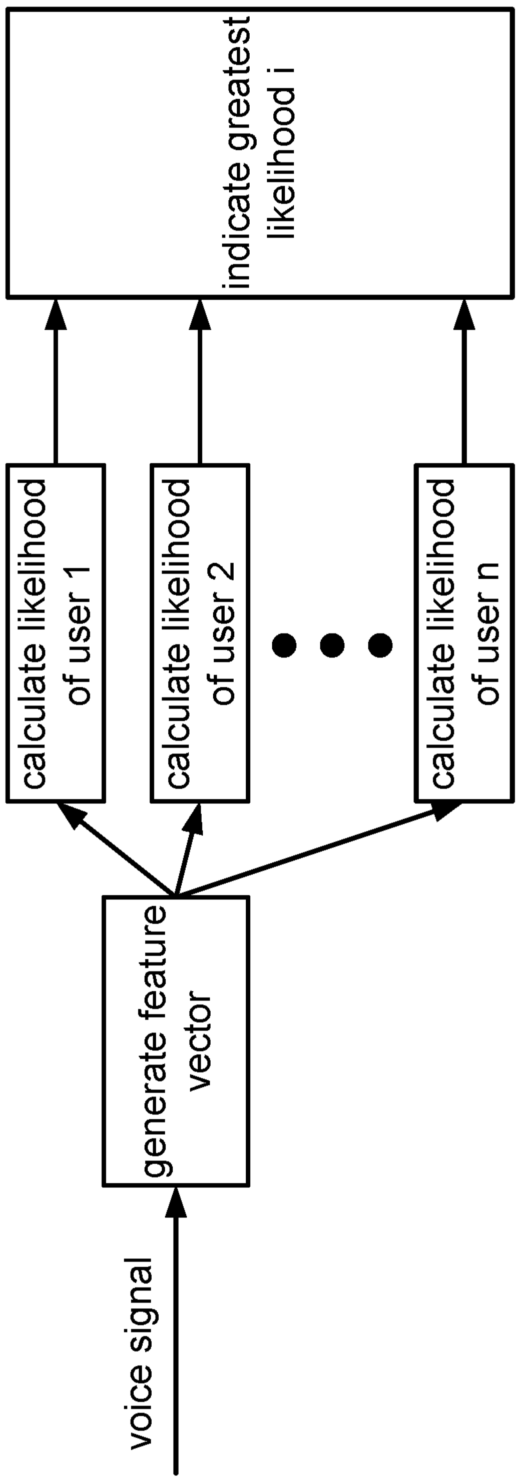
FIG. 15 shows an example of a voice authentication operation that uses Gaussian mixture models.

One example of a voice authentication operation uses Gaussian mixture models (GMMs). A GMM is a statistical method that evaluates the log-likelihood ratio that a certain utterance was spoken by a hypothesized speaker. As shown in FIG. 15, the operation may include a front-end processing block that receives the user's speech and produces a feature vector. For each of the n enrolled users, a corresponding GMM indicates the likelihood that the feature vector represents speech of the corresponding user, and the voice is classified according to the GMM that indicates the highest likelihood.

The voice authentication operation may be configured to use a deep neural network (DNN) to enable the individualized hearing deficiency compensation filter. The DNN (e.g., a fully-connected neural network) may be trained to model each of a number N of enrolled speakers, and the output layer of the DNN may be a 1×N one-hot vector that indicates which of the N speakers is predicted. In one example, the DNN is trained on arrays of feature vectors, where each array is calculated from speech of one of the enrolled speakers by forming the speech into a series of frames and computing a K-length vector of mel-frequency cepstral coefficients (MFCCs) for each frame. The voice authentication operation is then performed by computing K-length MFCC vectors in real-time from the voice signal to be classified and using these vectors as the input to the trained DNN.

In another example, a text-independent voice authentication operation is performed using a long short-term memory (LSTM) network. LSTM networks are relatively insensitive to lags of unknown duration, which may occur between important events in a time series. LSTM networks are well-suited to classifying time-series data and may be particularly effective for short utterances. Such an operation may be configured, for example, to use MFCCs to directly capture temporal speaker information that is classified, using the LSTM network, according to a set of enrolled users.

Additionally or alternatively, the device may select hearing compensation data (e.g., a hear-through compensation filter state) that corresponds to the current user based on recognition of a user's face. The recognition operation may be performed, for example, by another device that has a camera (e.g., a smartphone, tablet, laptop or other personal computer, smart glasses, etc.) and is wirelessly linked to send an indication of the recognized user i (e.g., via a Bluetooth® data link) to the personal audio device. In a further example, the recognition operation is performed by a head-mounted device ("HMD" such as smart glasses) that includes a camera arranged to capture an image of the user's face and also includes or is linked to the personal audio device.

Figure 16A:
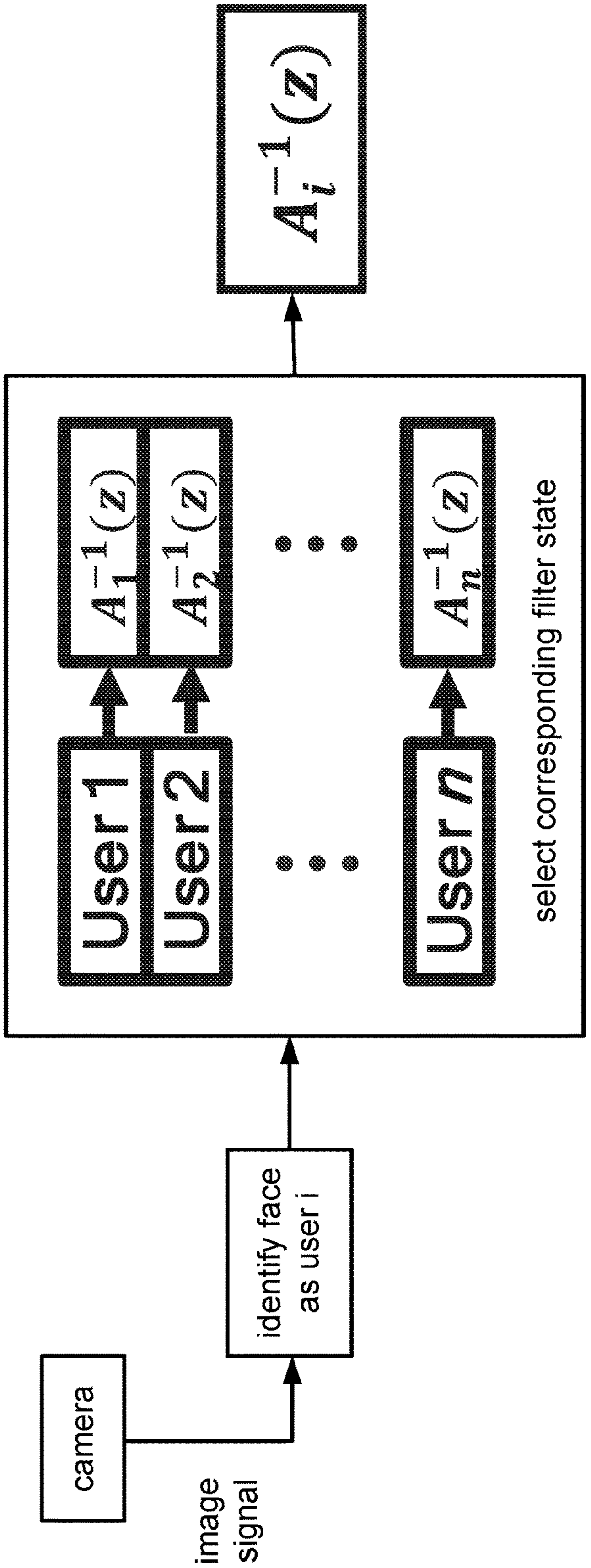
FIG. 16A shows a flow diagram for an operation to select a hear-through compensation filter state based on recognition of a user's face.

FIG. 16A shows a flow diagram for an operation to select hearing compensation data (a hear-through compensation filter state in the example of FIG. 16A) based on recognition of a user's face. A face recognition operation receives an image signal that includes the user's face (e.g., from a camera as described above) and recognizes the face as user i among a set of n enrolled users. An indication of the identification i is used to select the corresponding filter state from among a set of n stored filter states, and the selected filter state is copied into the compensation filter (e.g., compensation filter CF10).

The facial recognition operation may be performed using any of various approaches. In one example, the facial recognition operation uses principal component analysis to map the facial image from a high-dimensional space into a lower-dimensional space to facilitate comparison with sets of known images. Such a method may use an eigenface algorithm, for example.

The facial recognition operation may be a DNN-based method that uses convolutional and pooling layers to reduce the dimensionality of the problem. Such an operation may be configured to perform feature extraction via deep learning, followed by classification of the extracted features. Examples of algorithms that may be used include FaceNet and DeepFace.

Figure 16B:
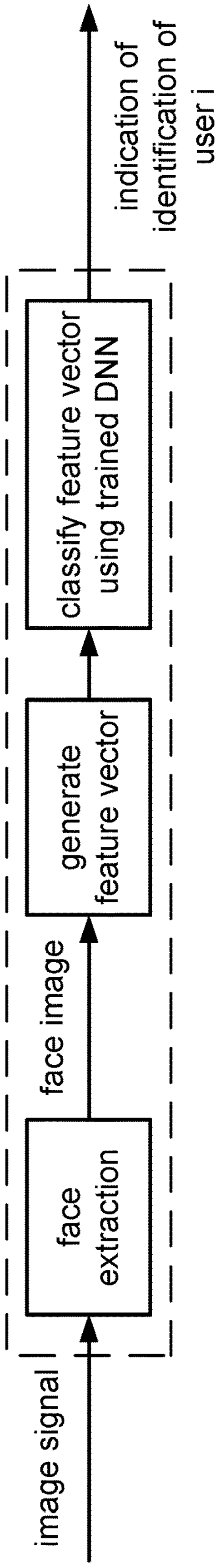
FIG. 16B shows an example of a facial recognition operation that uses a trained neural network.

The face recognition operation may be implemented as a classification of the user's face over the enrolled users. FIG. 16B shows an example of such an operation in which a trained DNN is used to perform the classification. The image signal is pre-processed to extract the face. The extracted face may be used as the feature vector to be classified, or an operation may be performed to generate the feature vector. The feature vector is input to a trained DNN, which classifies the vector to indicate the corresponding one among the set of n enrolled users.

In one example of a DNN-based face recognition operation, a face detector is used to localize a face, which is then aligned to normalized canonical coordinates in an image space. The normalized image is input to a face recognition module, which uses a trained DNN to extract a feature vector from the image. The extracted feature vector is then classified (using, for example, a support vector machine) to identify one among a set of enrolled users.

In a particular use case, it may be desired for a personal audio device to automatically transition into an acoustically transparent mode when the user is driving. A vehicle (e.g., an automobile) may include a camera arranged to capture an image of the driver and a processor configured to execute a facial recognition operation on the captured image and to transmit an indication of identification of the user i to the personal audio device (e.g., without any input by the user) for selection of the corresponding individualized hearing compensation data. The personal audio device may also be configured to automatically engage the acoustic transparent mode upon receiving the indication of identification of the user i and/or another signal from the processor of the vehicle. In a further example, the processor of the vehicle stores the hear-through compensation filter state that corresponds to the current user and uploads it to the personal audio device upon completing the facial recognition operation.

In a further example, the personal audio device is installed in or linked to a head-mounted device (HMD; e.g., smart glasses) that includes a camera arranged to capture an image of the user's eye (e.g., for gaze detection). In this case, the HMD is configured to perform an iris recognition operation to produce an indication of identification of the user i, which is received by the personal audio device and used to select the corresponding individualized hear-through compensation filter state.

Figure 17:
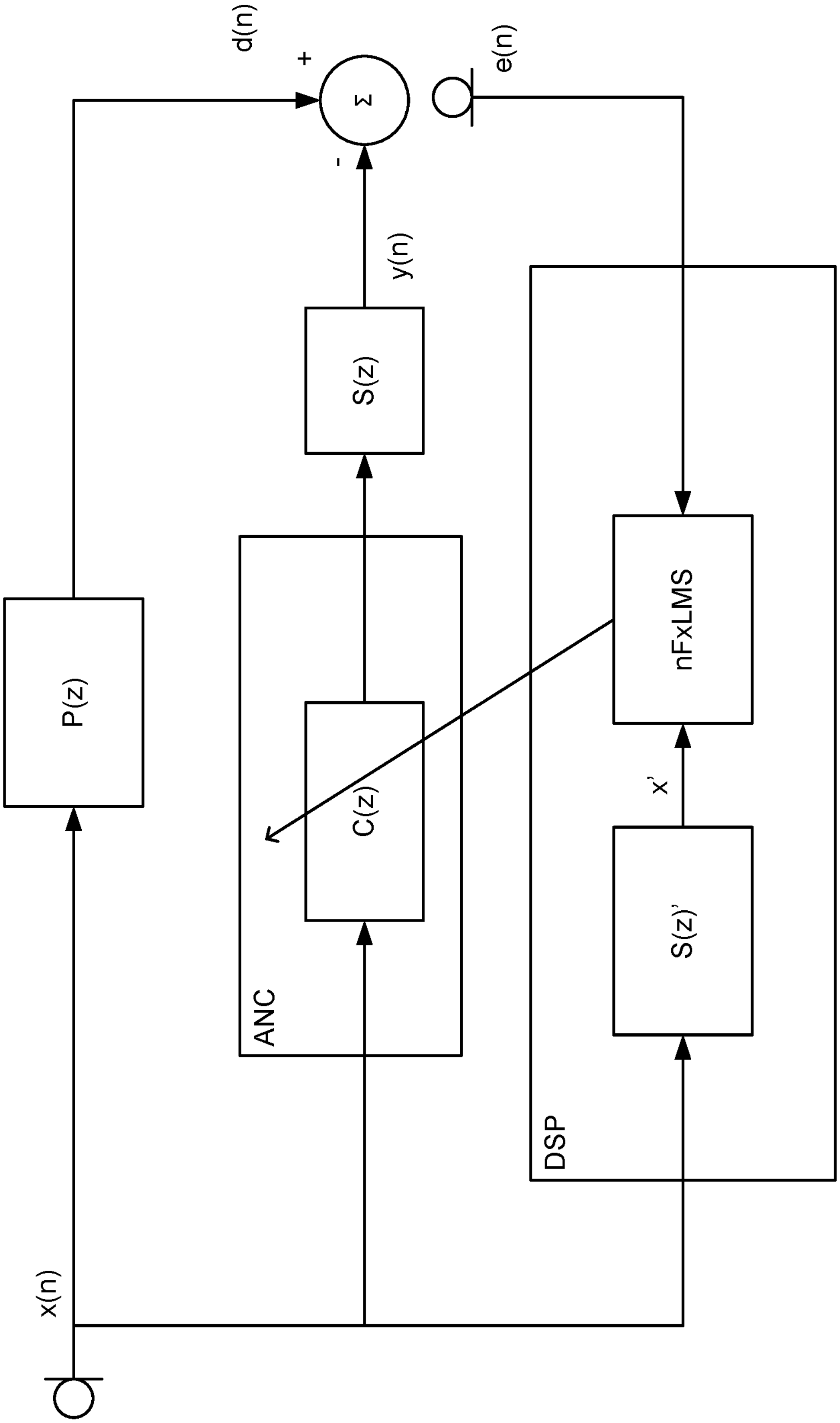
FIG. 17 shows an example of an ANC system that includes a feedforward ANC filter.
Figure 18:
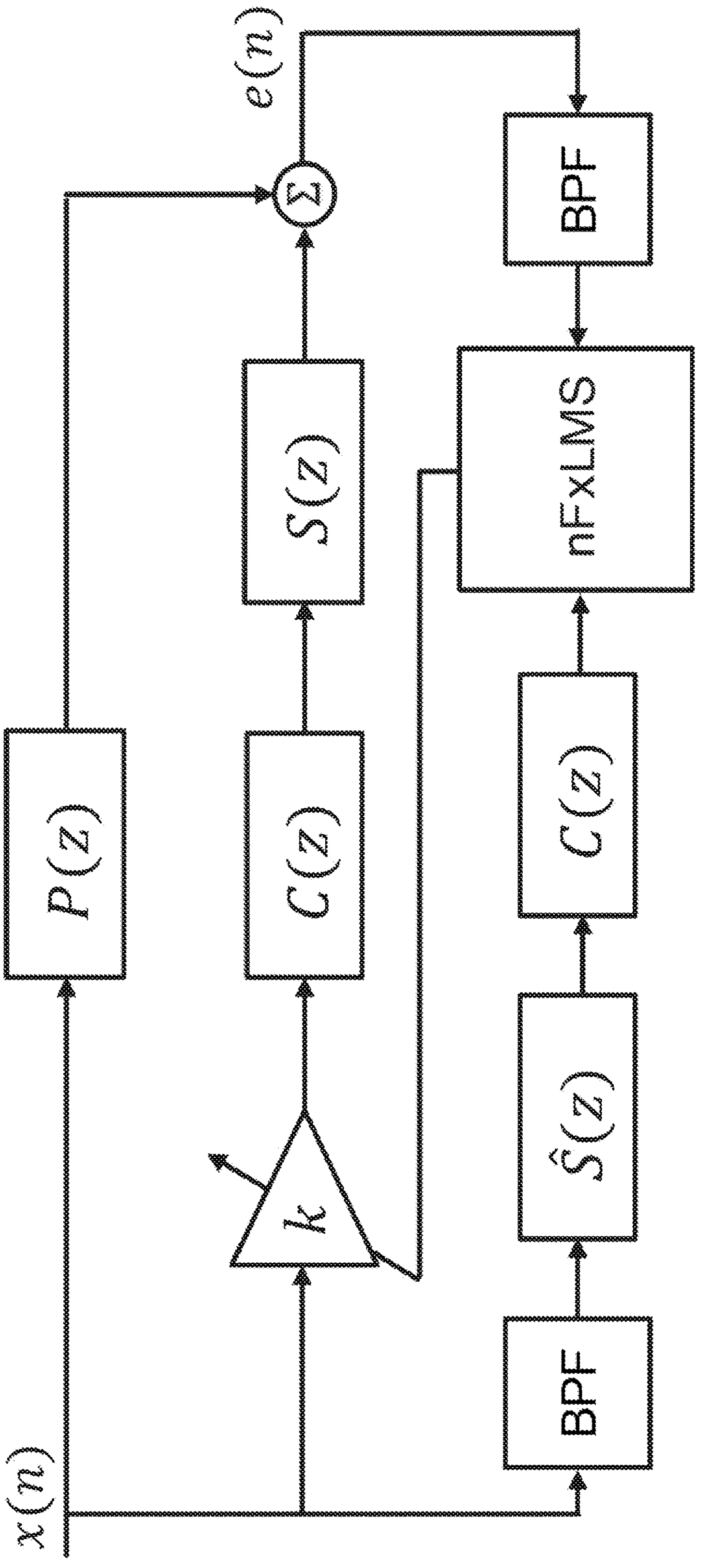
FIG. 18 shows an example of an ANC system that includes an ANC filter with a fixed transfer function C(z)
Figure 19:
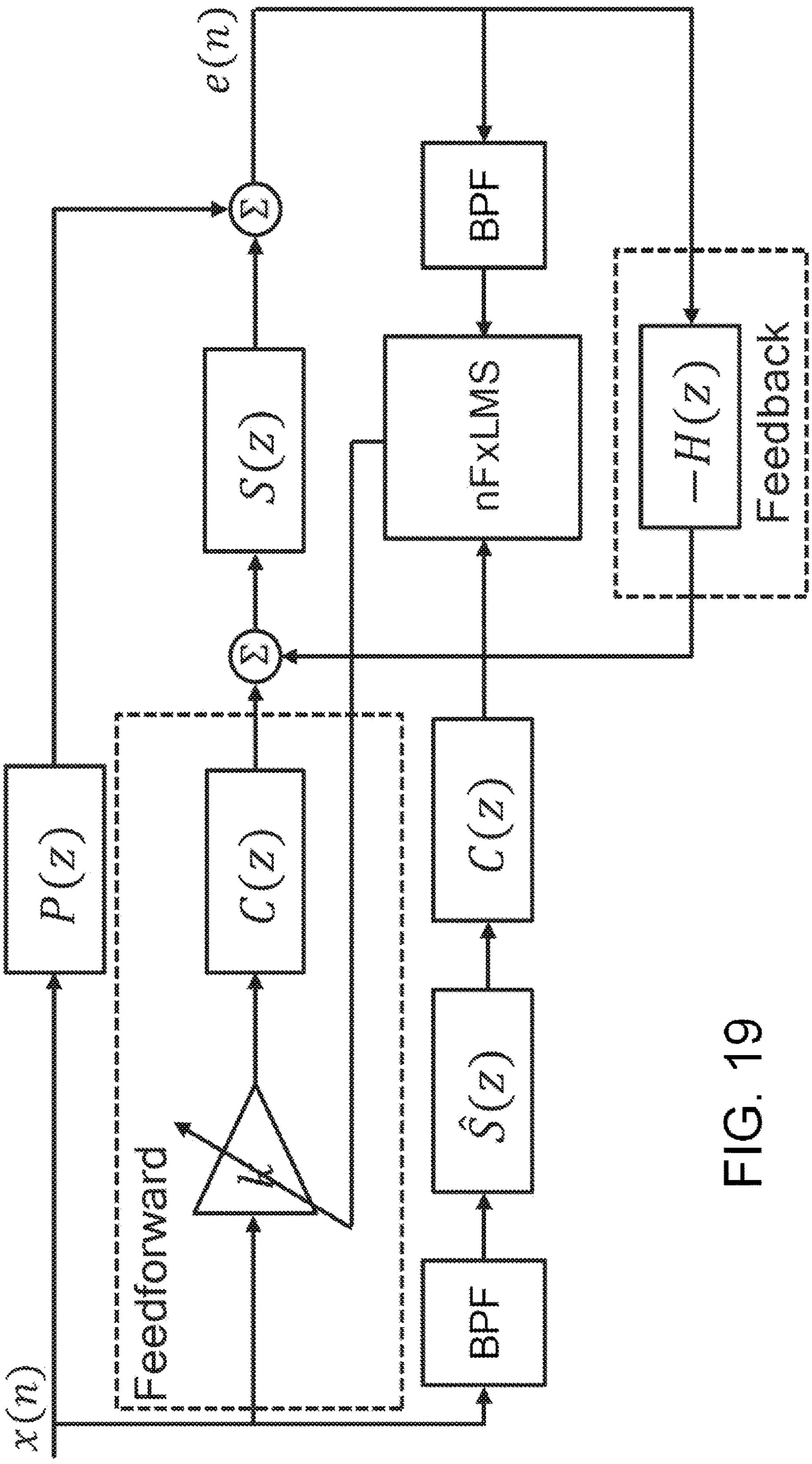
FIG. 19 shows an example of the ANC system of FIG. 17 with a fixed filter −H(z) on a feedback path.

A personal audio device as described herein may also include an ANC system configured to perform an ANC operation (e.g., for times when noise cancellation is desired, rather than acoustic transparency). FIG. 17 shows an example of an ANC system that includes a feedforward ANC filter whose transfer function C(z) is adapted according to a normalized filtered-X LMS (nFxLMS) algorithm. FIG. 18 shows an example of an ANC system that includes an ANC filter whose transfer function C(z) is fixed (implemented, for example, as a long-tap finite-impulse-response (FIR) or infinite-impulse-response (IIR) filter) and which includes a gain k that is adapted according to a normalized filtered-X LMS (nFxLMS) algorithm. In one example, the gain k is adapted according to the expression $k(n+1)=(1-\mu\gamma)k(n)+(-\nabla k)$, where $\mu$ denotes a step factor and $\gamma$ denotes a leakage factor. As shown in FIGS. 18 and 19, it may be desired to include a bandpass filter on the external microphone signal and/or on the internal microphone signal (e.g., to focus adaptation on low frequency noise reduction).

It may be desired to implement an ANC system to include a filter, which may be fixed or adaptive, on a feedback path. Such a feedback filter may be provided either in addition to or instead of a filter on a feedforward path. FIG. 19 shows an example of the ANC system of FIG. 18 which also includes a fixed filter −H(z) on a feedback path.

As shown in FIGS. 18 and 19, it may be desired to bandpass filter the signal inputs to the adaptive algorithm (e.g., to emphasize cancellation at low audio frequencies). It is also possible to implement a system as shown in FIG. 18 or FIG. 19 to switch between different fixed C(z) and/or different H(z) at different times (e.g., according to a particular audio frequency range in which it is desired to optimize cancellation at that time).

It may be desirable to configure the ANC filter to high-pass filter the signal (e.g., to attenuate high-amplitude, low-frequency acoustic signals). Additionally or alternatively, it may be desirable to configure the ANC filter to low-pass filter the signal (e.g., such that the ANC filter diminishes acoustic signals with frequency at high frequencies). Because the anti-noise signal should be available by the time the acoustic noise travels from the microphone to the actuator (i.e., the loudspeaker), the processing delay caused by the ANC filter should not exceed a very short time (typically about thirty to sixty microseconds). In the example shown in FIG. 17, the ANC filter executes in a first clock domain (e.g., in hardware at a clock rate of, for example, 8 MHz) and the adaptation executes in a second clock domain at a lower frequency (e.g., in software on a digital signal processor (DSP) clocked at a rate of, for example, 16 kHz). The examples shown in FIGS. 18 and 19 may be implemented likewise, and in the example shown in FIG. 19, the feedback filter may also execute in the higher-rate clock domain.

As shown in FIG. 1B, hearables D10L, D10R worn at each ear of a user may be configured to communicate audio and/or control signals to each other wirelessly (e.g., via a Bluetooth® data link or by near-field magnetic induction (NFMI)). In some cases, a hearable may also be provided with an inner microphone located inside the ear canal. For example, such a microphone may be used to obtain an error signal (e.g., feedback signal) for active noise cancellation (ANC). A hearable may be configured to communicate wirelessly with a wearable device or "wearable," which may, for example, send a volume level or other control command. Examples of wearables include (in addition to hearables) watches, head-mounted displays, headsets, fitness trackers, and pendants.

Hearables worn at each ear of a user may be configured to communicate audio and/or control signals to each other wirelessly. For example, the True Wireless Stereo (TWS) protocol allows a stereo Bluetooth stream to be provided to a master device (e.g., one of a pair of hearables), which reproduces one channel and transmits the other channel to a slave device (e.g., the other of the pair of hearables). Even when a pair of hearables is linked in such a fashion, many audio processing operations may occur independently on each device in the TWS group, such as ANC operation.

A situation in which each device modifies its ANC operation independently of the device at the user's other ear may result in an unbalanced listening experience. For wireless hearables, a mechanism in which the two hearables negotiate their states and share ANC-related information can help provide a more balanced ANC experience for the user. A device, method, and/or apparatus as described herein (e.g., one of a pair of hearables) may be further configured to exchange a parameter value or other indication with another device (the other of the pair of hearables) to provide a uniform user experience. In one example, it may be desired for a device to attenuate or disable an ANC path in response to an indication by the other device of a howl detection. In another example, it may be desired for the pair of hearables to perform a synchronized entry into a transparency mode (e.g., from an active (ambient) noise cancellation mode).

The human ear is generally insensitive to phase. However, a phase difference between a sound as perceived at the user's left and right ears can be important for spatial locatability. Accordingly, it may be desired for the phase responses of the hear-through paths at the user's left and right ears to be similar (e.g., in order to preserve such phase differences). In a further example, parameter values generated during adaptation of hear-through filter HF20 (e.g., updated coefficient values) are shared between personal audio devices (e.g., earbuds) worn at a user's left and right ears. Such shared parameters may be used to ensure that the adaptation operations at the left and right ears produce hear-through filter paths having similar phase responses.

Figure 20:
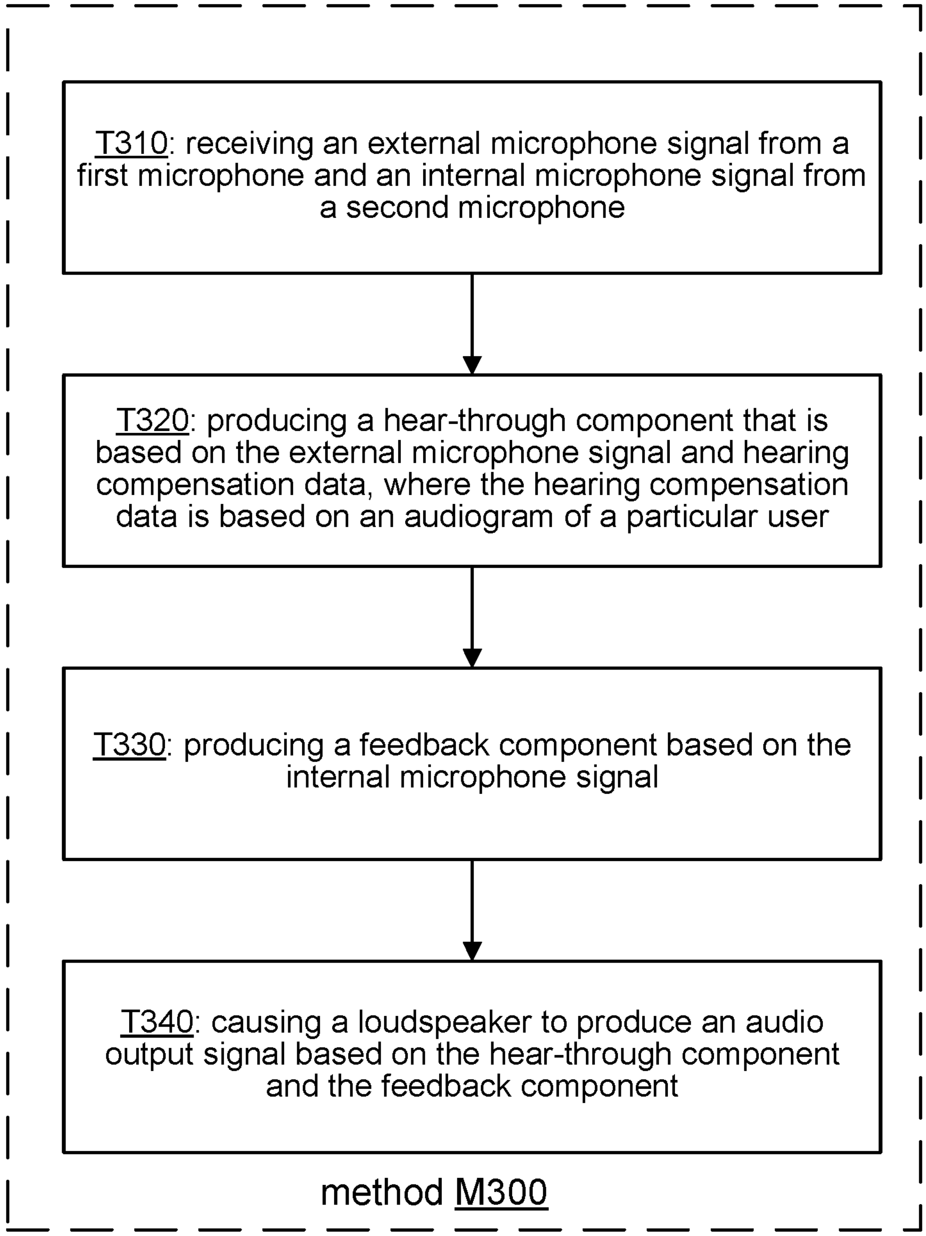
FIG. 20 shows a flow diagram for audio signal processing based on hearing compensation data for a particular user.

FIG. 20 shows a flow diagram of a method M300 for audio signal processing based on hearing compensation data for a particular user. The method M300 includes tasks T310, T320, T330, and T340. Task T310 receives an external microphone signal (e.g., external microphone signal XM10 described above) from a first microphone and an internal microphone signal (e.g., internal microphone signal EM10 described above) from a second microphone. Task T320 produces a hear-through component that is based on the external microphone signal and hearing compensation data, where the hearing compensation data is based on an audiogram of a particular user (e.g., as described above with reference to the compensation filter CF10 and the hear-through filter HF20). Task T330 produces a feedback component based on the internal microphone signal (e.g., as described above with reference to feedback ANC filter FB10). Task T340 causes a loudspeaker to produce an audio output signal based on the hear-through component and the feedback component (e.g., by mixing signals produced by tasks T320 and T330 and driving the loudspeaker based on a result of mixing the signals). In this method, a relation between the external microphone signal and the hear-through component varies in response to a change in a relation between the audio output signal and the internal microphone signal (e.g., a change in acoustic coupling between a loudspeaker that produces an acoustic signal based on the audio output signal and an internal microphone arranged to produce the internal microphone signal in response to the acoustic signal, wherein said acoustic coupling may vary as a result of e.g., fit variations). Additionally, in this method, hearing compensation data based on a user specific audiogram is used to improve perceived sound quality of audio provided to the user based on the user's own hearing deficiencies.

A device (e.g., a hearable) may be implemented to include a memory configured to store audio data, and a processor configured to receive the audio data from the memory and to perform method M300. An apparatus may be implemented to include means for performing each of tasks T310, T320, T330, and T340 (e.g., as software executing on hardware). A computer-readable storage medium may be implemented to include code which, when executed by at least one processor, causes the at least one processor to perform method M300.

Figure 21:
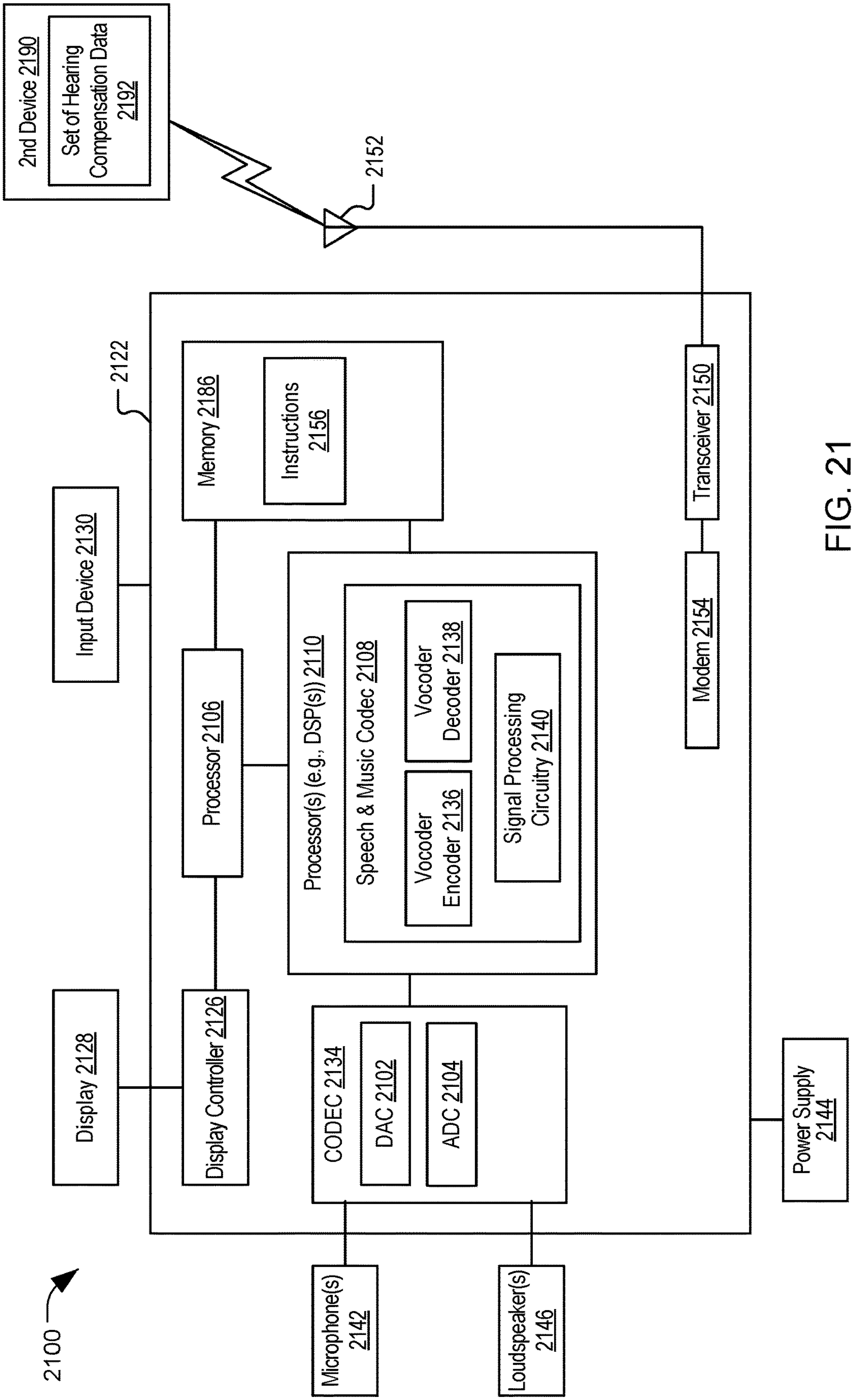
FIG. 21 shows a diagram of a device that is configured to perform audio signal processing based on hearing compensation data for a particular user.

Referring to FIG. 21, a block diagram of a particular illustrative implementation of a device is depicted and generally designated 2100. In an illustrative implementation, the device 2100 includes signal processing circuitry 2140, which may correspond to or include any of the filters, signal paths, or other audio signal processing components described above with reference to any of FIGS. 1-20. In an illustrative implementation, the device 2100 may perform one or more operations described with reference to FIGS. 1-20.

In the example illustrated in FIG. 21, the device 2100 is configured to communicate with a second device 2190. For example, the second device 2190 may store plurality of sets of hearing compensation data 2192. In this example, the device 2100 may retrieve particular hearing compensation data from the second device 2190 for use by signal processing circuitry 2140. To illustrate, the device 2100 may authenticate a user based on biometric data and send information identifying the authenticated user to the second device 2190. In this illustrative example, the second device 2190 selects particular hearing compensation data corresponding to the user from among the set of hearing compensation data 2192 and sends the particular hearing compensation data to the device 2100 for use.

Alternatively, the second device 2190 may authenticate the user. To illustrate, the second device 2190 may include one or more sensors (e.g., a fingerprint scanner, a camera, a microphone, etc.) to gather biometric data used to authenticate the user. As another illustrative example, the device 2100 may gather biometric data and send the biometric data to the second device 2190. In this illustrative example, the second device 2190 authenticates the user based on the biometric data received from the device 2100.

In a particular implementation, the device 2100 includes a processor 2106 (e.g., a central processing unit (CPU)). The device 2100 may include one or more additional processors 2110 (e.g., one or more DSPs). The processors 2110 may include a speech and music coder-decoder (CODEC) 2108 that includes a voice coder ("vocoder") encoder 2136, a vocoder decoder 2138, the signal processing circuitry 2140, or a combination thereof.

The device 2100 may include a memory 2186 and a CODEC 2134. The memory 2186 may include instructions 2156 that are executable by the one or more additional processors 2110 (or the processor 2106) to implement the functionality described with reference to one or more of FIGS. 1-20. The device 2100 may include a modem 2154 coupled, via a transceiver 2150, to an antenna 2152. The modem 2154, transceiver 2150, and antenna 2152 may facilitate exchange of data with another device, such as a second device 2190. For example, the second device 2190 may store a set of hearing compensation data corresponding to a plurality of users. In this example, the device 2100 may transmit (via the modem 2154, the transceiver 2150, and the antenna 2152) a request that includes user identification information, such as a user identity of a particular user or biometric identification data associated with the particular user. In this example, the second device 2190 may select, from among the set of hearing compensation data 2192, particular hearing compensation data that is associated with the particular user (such as a hear-through compensation filter state determined based on an audiogram of the particular user), as described above with reference to, for example, to FIGS. 9-16B. In some implementations, if the set of hearing compensation data 2192 does not include any hearing compensation data associated with the particular user, the processor 2106 or the processor(s) 2110 may execute the instructions 2156 to add hearing compensation data for the particular user to the set of hearing compensation data 2192. For example, the processor 2106 or the processor(s) 2110 may prompt the particular user to provide an audiogram (either by selecting a previously generate file or by testing the user's hearing) and may generate the hearing compensation data for the particular user based on the user's response to the prompt. In this example, the device 2100 may send the hearing compensation data to the second device 2190 for addition to the set of hearing compensation data 2192.

The device 2100 may include a display 2128 coupled to a display controller 2126. One or more loudspeakers 2146 and one or more microphones 2142 may be coupled to the CODEC 2134. The CODEC 2134 may include a digital-to-analog converter (DAC) 2102 and an analog-to-digital converter (ADC) 2104. In a particular implementation, the CODEC 2134 may receive analog signals from the microphone(s) 2142, convert the analog signals to digital signals using the analog-to-digital converter 2104, and send the digital signals to the speech and music codec 2108. In a particular implementation, the speech and music codec 2108 may provide digital signals to the CODEC 2134. The CODEC 2134 may convert the digital signals to analog signals using the digital-to-analog converter 2102 and may provide the analog signals to the loudspeaker(s) 2146.

In a particular implementation, the device 2100 may be included in a system-in-package or system-on-chip device 2122. In a particular implementation, the memory 2186, the processor 2106, the processors 2110, the display controller 2126, the CODEC 2134, the modem 2154, and the transceiver 2150 are included in a system-in-package or system-on-chip device 2122. In a particular implementation, an input device 2130 and a power supply 2144 are coupled to the system-in-package or system-on-chip device 2122. Moreover, in a particular implementation, as illustrated in FIG. 21, the display 2128, the input device 2130, the loudspeaker(s) 2146, the microphone(s) 2142, the antenna 2152, and the power supply 2144 are external to the system-in-package or system-on-chip device 2122. In a particular implementation, each of the display 2128, the input device 2130, the loudspeaker(s) 2146, the microphone(s) 2142, the antenna 2152, and the power supply 2144 may be coupled to a component of the system-in-package or system-on-chip device 2122, such as an interface or a controller.

The device 2100 may include a hearable, a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

Figure 22:
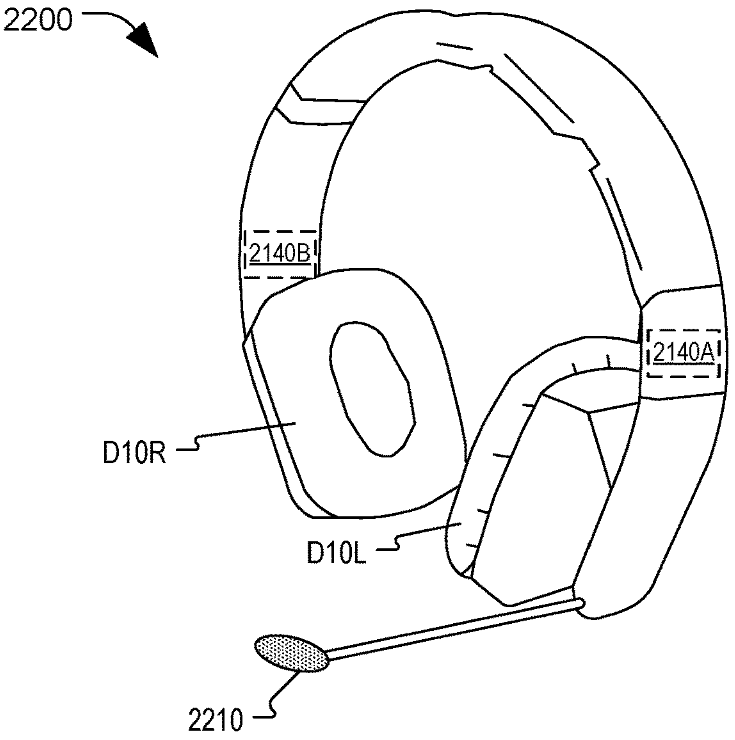
FIG. 22 shows a diagram of a headset that is configured to perform audio signal processing based on hearing compensation data for a particular user.
Figure 23:
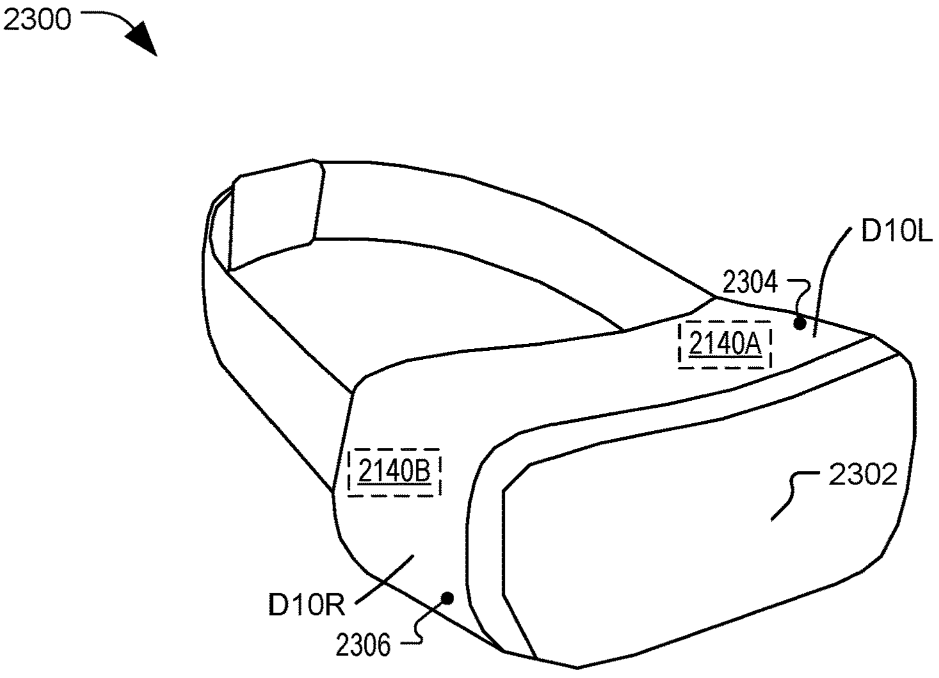
FIG. 23 shows a diagram of an extended reality (e.g., virtual reality, mixed reality, or augmented reality) headset that is configured to perform audio signal processing based on hearing compensation data for a particular user.

In various implementations, the device 2100 may have more or fewer components than illustrated in FIG. 21. For example, when the device 2100 corresponds to a hearable, the device 2100 may, in some implementations, omit the display 2128 and the display controller 2126. In some implementations, the device 2100 corresponds to a smart phone or another portable electronic device that provides audio data to a hearable (not shown in FIG. 21). In such implementations, the signal processing circuitry 2140 may be included in the hearable rather than (or in addition to) in the device 2100. FIGS. 22 and 23 illustrate examples of hearables that include instances the signal processing circuitry 2140. In such implementations, the second device 2190 may include a server or other computing device that stores the sets of hearing compensation data 2192 and provides particular hearing compensation data to the device 2100 based on a request from the device 2100. The device 2100 may subsequently provide the particular hearing compensation data to the hearable for use in processing audio data.

FIG. 22 shows a diagram of a headset device 2200 that is configured to perform audio signal processing based on hearing compensation data for a particular user. In FIG. 22, components of the device 2100, such as the signal processing circuitry 2140, are integrated in the headset device 2200. The headset device 2200 includes microphones 2210 positioned to capture speech of a user and environmental sounds. In a particular example, the headset device 2200 includes one or more hearables, such as the hearables D10L and DIOR, each of which may include or be coupled to an instance of the signal processing circuitry 2140. To illustrate, the hearable D10L may include or be coupled to the signal processing circuitry 2140A, and the hearable DIOR may include or be coupled to the signal processing circuitry 2140B.

FIG. 23 shows a diagram of an extended reality (e.g., virtual reality, mixed reality, or augmented reality) headset 2300 that is configured to perform audio signal processing based on hearing compensation data for a particular user. In FIG. 23, the headset 2300 includes a visual interface device 2302 positioned in front of the user's eyes to enable display of augmented reality or virtual reality images or scenes to the user while the headset 2300 is worn. The headset 2300 also includes one or more microphones 2304, 2306 to capture ambient sound (e.g., the external microphones signal XM10 described above), to capture an error signal (e.g., the internal microphone signal EM10 described above), etc. The headset 2300 also includes one or more instances of the signal processing circuitry 2140 of FIG. 20, such as signal processing circuitry 2140A and 2140B. In a particular example, a user of the headset 2300 may participate in a conversation with a remote participant, such as via a video conference using the microphones 2304, 2306, audio speakers, and the visual interface device 2302.

Any of the systems described herein may be implemented as (or as a part of) an apparatus, a device, an assembly, an integrated circuit (e.g., a chip), a chipset, or a printed circuit board. In one example, such a system is implemented within a cellular telephone (e.g., a smartphone). In another example, such a system is implemented within a hearable or other wearable device.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

The terms "coder," "codec," and "coding system" are used interchangeably to denote a system that includes at least one encoder configured to receive and encode frames of an audio signal (possibly after one or more pre-processing operations, such as a perceptual weighting and/or other filtering operation) and a corresponding decoder configured to produce decoded representations of the frames. Such an encoder and decoder are typically deployed at opposite terminals of a communications link. The term "signal component" is used to indicate a constituent part of a signal, which signal may include other signal components. The term "audio content from a signal" is used to indicate an expression of audio information that is carried by the signal.

The various elements of an implementation of an apparatus or system as disclosed herein may be embodied in any combination of hardware with software and/or with firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs (digital signal processors), FPGAs (field-programmable gate arrays), ASSPs (application-specific standard products), and ASICs (application-specific integrated circuits). A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100, M200, or M300 (or another method as disclosed with reference to operation of an apparatus or system described herein), such as a task relating to another operation of a device or system in which the processor is embedded (e.g., a voice communications device, such as a smartphone, or a smart speaker). It is also possible for part of a method as disclosed herein to be performed under the control of one or more other processors.

Particular aspects of the disclosure are described below in a first set of interrelated clauses:

According to Clause 1, a device for audio signal processing includes: a memory configured to store instructions; and a processor configured to execute the instructions to: receive an external microphone signal from a first microphone; produce a hear-through component that is based on the external microphone signal and hearing compensation data, wherein the hearing compensation data is based on an audiogram of a particular user; and cause a loudspeaker to produce an audio output signal based on the hear-through component.

Clause 2 includes the device of Clause 1, wherein the audiogram represents a hearing deficiency profile of the particular user.

Clause 3 includes the device of Clause 1 or Clause 2, wherein the processor is configured to execute the instructions to generate the hearing compensation data based on an inverse of the audiogram.

Clause 4 includes the device of any of Clauses 1 to 3, wherein the processor is configured to execute the instructions to receive the hearing compensation data from a second device.

Clause 5 includes the device of Clause 4, wherein the hearing compensation data is accessed based on authentication of the particular user.

Clause 6 includes the device of Clause 5, wherein the particular user is authenticated based on voice recognition.

Clause 7 includes the device of Clause 5 or Clause 6, wherein the particular user is authenticated based on facial recognition.

Clause 8 includes the device of any of Clauses 5 to 7, wherein the particular user is authenticated based on iris recognition.

Clause 9 includes the device of any of Clauses 5 to 8, wherein the memory is configured to store a set of hearing compensation data corresponding to a plurality of users, and wherein a request to retrieve the hearing compensation data is sent to a second device based on determining that the set of hearing compensation data does not include any hearing compensation data associated with the particular user.

Clause 10 includes the device of any of Clauses 5 to 9, wherein a second device performs user authentication operations and provides the hearing compensation data to the device responsive to the authentication of the particular user.

Clause 11 includes the device of Clause 10, wherein the processor is further configured to execute the instructions to add the hearing compensation data to the set of hearing compensation data.

Clause 12 includes the device of any of Clauses 1 to 11, wherein the processor is further configured to execute the instructions to update the hearing compensation data based on a hearing test of the particular user.

Clause 13 includes the device of any of Clauses 1 to 12, wherein a relation between the external microphone signal and the hear-through component varies in response to a change in placement of an earphone within an ear canal.

Clause 14 includes the device of any of Clauses 1 to 13, wherein the memory, the processor, the first microphone, and the loudspeaker are integrated in at least one of a headset, a personal audio device, or an earphone.

Clause 15 includes the device of any of Clauses 1 to 14, wherein a relation between the external microphone signal and the hear-through component varies in response to a change in a relation between the audio output signal and the internal microphone signal.

Clause 16 includes the device of any of Clauses 1 to 15, wherein the processor is further configured to execute the instructions to receive a reproduced audio signal, wherein the audio output signal is based on the reproduced audio signal.

Clause 17 includes the device of any of Clauses 1 to 16, wherein the processor is further configured to execute the instructions to dynamically adjust the hear-through component to reduce an occlusion effect.

Clause 18 includes the device of any of Clauses 1 to 17, wherein the processor is further configured to: receive an internal microphone signal from a second microphone; and produce a feedback component based on the internal microphone signal, wherein the audio output signal is further based on the feedback component, wherein the feedback component is to reduce components of the internal microphone signal except for the hear-through component.

According to Clause 19, a method of audio signal processing includes: receiving an external microphone signal from a first microphone; producing a hear-through component that is based on the external microphone signal and hearing compensation data, wherein the hearing compensation data is based on an audiogram of a particular user; and causing a loudspeaker to produce an audio output signal based on the hear-through component.

Clause 20 includes the method of Clause 19, further including receiving a reproduced audio signal, wherein the audio output signal includes the reproduced audio signal, and wherein a relation between the external microphone signal and the hear-through component varies when the reproduced audio signal is not active.

Clause 21 includes the method of Clause 19 or Clause 20, wherein a relation between the external microphone signal and the hear-through component varies in response to a change in a placement of a device within an ear canal.

Clause 22 includes the method of any of Clauses 19 to 21, wherein the hearing compensation data is selected, based on a signal, from among a set of hearing compensation data corresponding to a plurality of users, wherein the signal identifies the particular user.

Clause 23 includes the method of Clause 22, wherein the signal that identifies the particular user is produced based on a voice authentication operation.

Clause 24 includes the method of Clause 22 or Clause 23, wherein the signal that identifies the particular user is produced based on a facial recognition operation.

Clause 25 includes the method of any of Clauses 22 to 24, wherein the signal that identifies the particular user is produced based on a biometric identification operation.

Clause 26 includes the method of any of Clauses 20 to 25, further comprising: receiving an internal microphone signal from a second microphone; and producing a feedback component that is out of phase with the internal microphones signal, wherein the audio output signal is further based on the feedback component.

According to Clause 27, an apparatus for audio signal processing includes: means for receiving an external microphone signal from a first microphone; means for producing a hear-through component that is based on the external microphone signal and hearing compensation data, wherein the hearing compensation data is based on an audiogram of a particular user; and means for causing a loudspeaker to produce an audio output signal based on the hear-through component.

Clause 28 includes the apparatus of Clause 27, further including means for selecting the hearing compensation data from among a set of hearing compensation data based on a signal, wherein the set of hearing compensation data correspond to a plurality of users, and wherein the signal identifies the particular user.

Clause 29 includes the apparatus of Clause 28, wherein the signal that identifies the particular user is produced by a biometric authentication operation.

Clause 30 includes the apparatus of any of Clauses 27 to 29, wherein a relation between the external microphone signal and the hear-through component varies in response to a change in a placement of a device within an ear canal of the particular user.

Clause 31 includes the apparatus of any of Clauses 27 to 30, further including means for receiving an internal microphone signal from a second microphone; and means for producing a feedback component that is out of phase with the internal microphone signal, wherein the audio output signal if further based on the feedback component.

According to Clause 32, a non-transitory computer-readable storage medium includes instructions which, when executed by at least one processor, cause the at least one processor to: receive an external microphone signal from a first microphone; produce a hear-through component that is based on the external microphone signal and hearing compensation data, wherein the hearing compensation data is based on an audiogram of a particular user; and cause a loudspeaker to produce an audio output signal based on the hear-through component.

Clause 33 includes the non-transitory computer-readable storage medium of Clause 32, wherein the hearing compensation data is selected from among a set of hearing compensation data based on a signal, wherein the set of hearing compensation data correspond to a plurality of users, and wherein the signal identifies the particular user based on biometric authentication.

Clause 34 includes the non-transitory computer-readable storage medium of Clause 28 or Clause 33, wherein a relation between the external microphone signal and the hear-through component varies in response to a change in a placement of a device within an ear canal.

Clause 35 includes the non-transitory computer-readable storage medium of Clause 28 or Clause 34, wherein the instructions, when executed by the at least one processor, further cause the at least one processor to: receive an internal microphone signal from a second microphone and produce a feedback component that is out of phase with the internal microphone signal, wherein the audio output signal is further based on the feedback component.

Each of the tasks of the methods disclosed herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

In one or more exemplary embodiments, the operations described herein may be implemented in hardware, software, firmware, or any combination thereof. If implemented in software, such operations may be stored on or transmitted over a computer-readable medium as one or more instructions or code. The term “computer-readable media” includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device for audio signal processing, the device comprising:

a memory configured to store audio data; and a processor coupled to the memory, the processor configured to:

use an adaptation filter to adapt update filter coefficients of an update filter, the update filter coefficients adapted based on a difference between an internal microphone signal and an output of the adaptation filter, wherein an input of the adaptation filter is based on an external microphone signal;

output an output signal from a hear-through filter, wherein the hear-through filter includes the update filter and the adaptation filter; and cause a loudspeaker to produce an audio output signal based on the output signal of the hear-through filter.

2. The device of claim 1, wherein the update filter coefficients are adapted to account for variations in fit over time of an earphone.

3. The device of claim 1, wherein the processor, the memory, an internal microphone configured to generate the internal microphone signal, an external microphone configured to generate the external microphone signal, and the loudspeaker are integrated in an earphone.

4. The device of claim 1, wherein the processor is configured to adapt the update filter coefficients at a lower rate than a rate at which adaptation filter coefficients of the adaptive filter are updated.

5. The device of claim 1, wherein the hear-through filter is configured to aid in generation of acoustic transparency in the audio output signal produced by the loudspeaker.

6. The device of claim 1, wherein the update filter coefficients are adapted to cause the internal microphone signal to equal the external microphone signal even when acoustic transfer functions change due to variations in fit of an earphone.

7. The device of claim 1, wherein the output signal of the hear-through filter is further based on a cancellation signal to cancel a voice component corresponding to a particular user.

8. The device of claim 1, wherein the processor is configured to receive, from a second device, hearing compensation data associated with a particular user, and wherein the output signal of the hear-through filter is based on the hearing compensation data.

9. The device of claim 8, wherein the memory is configured to store a set of hearing compensation data corresponding to a plurality of users, wherein the processor is configured to initiate sending a request to the second device to retrieve the hearing compensation data, and wherein the request is sent to the second device based on a determination that the set of hearing compensation data does not include any hearing compensation data associated with the particular user.

10. The device of claim 9, wherein the processor is configured to add the hearing compensation data to the set of hearing compensation data.

11. The device of claim 8, wherein the processor is configured to update the hearing compensation data based on a hearing test of the particular user.

12. The device of claim 1, wherein a relation between the external microphone signal and the hear-through filter varies in response to a change in placement of an earphone within an ear canal.

13. The device of claim 1, wherein the memory, the processor, an external microphone, an internal microphone, and the loudspeaker are integrated in at least one of a headset or a personal audio device.

14. The device of claim 1, wherein the processor is configured to produce the audio output signal based on a change in a relation between the external microphone signal and the internal microphone signal.

15. The device of claim 1, wherein the processor is configured to receive a reproduced audio signal, and wherein the audio output signal is based on the reproduced audio signal.

16. The device of claim 1, wherein the processor is configured to dynamically adjust the hear-through filter to reduce an occlusion effect.

17. A method of audio signal processing, the method comprising:

using an adaptation filter to adapt update filter coefficients of an update filter, the update filter coefficients adapted based on a difference between an internal microphone signal and an output of the adaptation filter, wherein an input of the adaptation filter is based on an external microphone signal;

outputting an output signal from a hear-through filter, wherein the hear-through filter includes the update filter and the adaptation filter; and causing a loudspeaker to produce an audio output signal based on the output signal of the hear-through filter.

18. The method of claim 17, further comprising receiving a reproduced audio signal, wherein the audio output signal includes the reproduced audio signal, and wherein a relation between the external microphone signal and the hear-through filter varies when the reproduced audio signal is not active.

19. The method of claim 17, wherein a relation between the external microphone signal and the hear-through filter varies in response to a change in a placement of a device within an ear canal.

20. The method of claim 17, wherein hearing compensation data is selected, based on a signal, from among a set of hearing compensation data corresponding to a plurality of users, wherein the signal identifies a particular user, and wherein the output signal of the hear-through filter is based on the hearing compensation data.

21. The method of claim 20, wherein the signal that identifies the particular user is produced based on a voice authentication operation.

22. The method of claim 20, wherein the signal that identifies the particular user is produced based on a facial recognition operation.

23. The method of claim 17, further comprising producing a feedback signal that is out of phase with the internal microphone signal, wherein the audio output signal is further based on the feedback signal.

24. An apparatus for audio signal processing, the apparatus comprising:

means for using an adaptation filter to adapt update filter coefficients of an update filter, the update filter coefficients adapted based on a difference between an internal microphone signal and an output of the adaptation filter, wherein an input of the adaptation filter is based on an external microphone signal;

means for outputting an output signal from a hear-through filter, wherein the hear-through filter includes the update filter and the adaptation filter; and means for causing a loudspeaker to produce an audio output signal based on the output signal of the hear-through filter.

25. The apparatus of claim 24, further comprising means for selecting hearing compensation data from among a set of hearing compensation data based on a signal, wherein the set of hearing compensation data correspond to a plurality of users, wherein the signal identifies a particular user, and wherein the output signal of the hear-through filter is based on the hearing compensation data.

26. The apparatus of claim 25, wherein the signal that identifies the particular user is produced by a biometric authentication operation.

27. The apparatus of claim 24, wherein a relation between the external microphone signal and the hear-through filter varies in response to a change in a placement of a device within an ear canal.

28. A non-transitory computer-readable storage medium comprising instructions which, when executed by at least one processor, cause the at least one processor to:

use an adaptation filter to adapt update filter coefficients of an update filter, the update filter coefficients adapted based on a difference between an internal microphone signal and an output of the adaptation filter, wherein an input of the adaptation filter is based on an external microphone signal;

output an output signal from a hear-through filter, wherein the hear-through filter includes the update filter and the adaptation filter; and cause a loudspeaker to produce an audio output signal based on the output signal of the hear-through filter.

29. The non-transitory computer-readable storage medium of claim 28, wherein hearing compensation data is selected from among a set of hearing compensation data based on a signal, wherein the set of hearing compensation data correspond to a plurality of users, wherein the signal identifies a particular user based on biometric authentication, and wherein the output signal of the hear-through filter is based on the hearing compensation data.

30. The non-transitory computer-readable storage medium of claim 28, wherein a relation between the external microphone signal and the hear-through filter varies in response to a change in a placement of a device within an ear canal.

* * * * *